US011827993B1

(12) United States Patent
Yao et al.

(10) Patent No.: US 11,827,993 B1
(45) Date of Patent: *Nov. 28, 2023

(54) METHODS OF FORMING ACTIVE MATERIALS FOR ELECTROCHEMICAL CELLS USING LOW-TEMPERATURE ELECTROCHEMICAL DEPOSITION

(71) Applicant: Gru Energy Lab Inc., San Jose, CA (US)

(72) Inventors: Xiahui Yao, San Jose, CA (US); Xiaohua Liu, Mountain View, CA (US); Sa Zhou, Fremont, CA (US); Song Han, Foster City, CA (US)

(73) Assignee: GRU Energy Lab Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,687

(22) Filed: Sep. 17, 2021

Related U.S. Application Data

(60) Provisional application No. 63/080,218, filed on Sep. 18, 2020.

(51) Int. Cl.
C25B 1/00 (2021.01)
C25B 1/33 (2021.01)
(Continued)

(52) U.S. Cl.
CPC .............. *C25D 17/12* (2013.01); *C25D 3/02* (2013.01)

(58) Field of Classification Search
CPC ... C25D 3/12; C25D 3/20; C25D 3/30; C25D 3/38; C25D 3/50; C25D 3/56;
(Continued)

(56) References Cited

U.S. PATENT DOCUMENTS 5,690,807 A 11/1997 Clark, Jr. et al.
2005/0072679 A1 4/2005 Nayfeh et al.
(Continued)

FOREIGN PATENT DOCUMENTS

| GB | 1571298 A | * | 7/1980 | ............ C25D 21/18 |
| JP | 2005116264 A | | 4/2005 | |
| KR | 1478200 B1 | * | 1/2015 | ............ B32B 15/08 |

OTHER PUBLICATIONS

Dogan et al., "Electrodeposited Copper Foams as Substrates for Thin Film Silicon Electrodes," Solid State Ionics (May 1, 2016), vol. 288, pp. 204-206. (Year: 2016).*

(Continued)

Primary Examiner — Edna Wong
(74) Attorney, Agent, or Firm — Polygon IP, LLP

(57) ABSTRACT

Provided are methods of forming active materials for electrochemical cells using low-temperature electrochemical deposition, e.g., less than 200° C. Specifically, these processes allow precise control of the morphology, composition, and size of deposited structures. For example, the deposited structure may be doped, alloyed, or surface treated during their deposition using a combination of different precursors. In particular, silicon structure may be pre-lithiated while these structures are being formed. The selection of working electrodes (surface size and properties), electrolyte composition, and other parameters result in different types of structures, e.g., precipitating from the electrolyte or deposited on the electrode. Low-temperature plating does not require a lot of energy and volatile and invisible precursors. Furthermore, this plating produces a more confined waste stream, suitable for post-reaction recycling. Finally, low-temperature electrochemical deposition can be readily scaled up such that plating bathes and electrode sizes can be chosen to fit the production requirements.

20 Claims, 23 Drawing Sheets

(51) Int. Cl.
*C25B 1/50* (2021.01)
*C25D 17/12* (2006.01)
*C25D 3/02* (2006.01)

(58) Field of Classification Search
CPC ........ C25D 3/562; C25D 5/022; C25D 5/623;
C25D 3/665; C25B 1/00; C25B 1/33;
C25B 1/50
USPC ....... 205/238, 252, 255, 264, 270, 271, 291,
205/118, 560, 549, 557
See application file for complete search history.

(56) References Cited

U.S. PATENT DOCUMENTS

| | | |
|---|---|---|
| 2006/0213779 A1 | 9/2006 | Nayfeh et al. |
| 2008/0233038 A1 | 9/2008 | Hayashida |
| 2010/0059118 A1 | 3/2010 | Saegusa |
| 2014/0227548 A1* | 8/2014 | Myrick ............... C10L 1/28 203/40 |
| 2014/0248543 A1* | 9/2014 | Zhu ................... H01M 4/387 205/60 |

OTHER PUBLICATIONS

Zhao et al., "Electrodeposited Si Film with Excellent Stability and High Rate Performance for Lithium-Ion Battery Anodes," Materials Letters (Jun. 1, 2012), vol. 76, pp. 55-58. (Year: 2012).*

Agrawal et al., "Electrodeposition of Silicon from Solutions of Silicon Halides in Aprotic Solvents," Journal of The Electrochemical Society (Nov. 1, 1981), vol. 128, No. 11, pp. 2292-2296. (Year: 1981).*

Schmuck et al., "Alloying of Electrodeposited Silicon with Lithium—A Principal Study of Applicability as Anode Material for Lithium Ion Batteries," Journal of Solid State Electrochemistry (Dec. 2010), vol. 14, No. 12, pp. 2203-2207. (Year: 2010).*

Nicholson, "Electrodeposition of Silicon from Nonaqueous Solvents," Journal of the Electrochemical Society (Oct. 17, 2005), vol. 152, No. 12, pp. C795-C802. (Year: 2005).*

Kim et al., "Electrochemical Properties of Organic Electrolyte Solutions Containing 1-Ethyl-3-Methylimidazolium Tetrafluoroborate Salt," Research on Chemical Intermediates (Jul. 2015), vol. 41, No. 7, pp. 4749-4759. (Year: 2015).*

Vichery et al., "Stabilization Mechanism of Electrodeposited Silicon Thin Films," Physical Chemistry Chemical Physics (2014), vol. 16, No. 40, pp. 22222-22228. (Year: 2014).*

Gattu, Bharat et al., Pulsed Current Electrodeposition of Silicon Thin Films Anodes for Lithium Ion Battery Applications; Inorganics 2017, 5, 27, 14 pgs.

Heath, J. R. A Liquid-Solution-Phase Synthesis of Crystalline Silicon. Science 258, 1131 (1992).

Nicholson, J. P. Electrodeposition of Silicon from Nonaqueous Solvents. J. Electrochem. Soc. 152, C795 (2005).

Shavel, A., Guerrini, L. & Alvarez-Puebla, R. A. Colloidal synthesis of silicon nanoparticles in molten salts. Nanoscale 9, 8157-8163 (2017).

U.S. Appl. No. 17/111,095, filed Dec. 3, 2020. 32 pages.

Zhang, Junling et al., Electrodeposition of crystalline silicon directly from silicon tetrachloride in ionic liquid at low temperature; RSC Adv., 2016, pp. 12061-12067.

U.S. Appl. No. 17/111,095, Final Office Action dated Nov. 28, 2022, 25 pgs.

U.S. Appl. No. 17/111,095, Non Final Office Action dated Sep. 2, 2022, 33 pgs.

U.S. Appl. No. 17/111,095, Non Final Office Action dated May 4, 2023, 28 pgs.

Ishibashi et al., "The Effect of the Deposition Conditions on the Electrodeposition of Si Nanopillars in TMHATFSI," ECSTransactions (Apr. 1, 2013), vol. 50, No. 48, pp. 117-126. (Year: 2013).

* cited by examiner

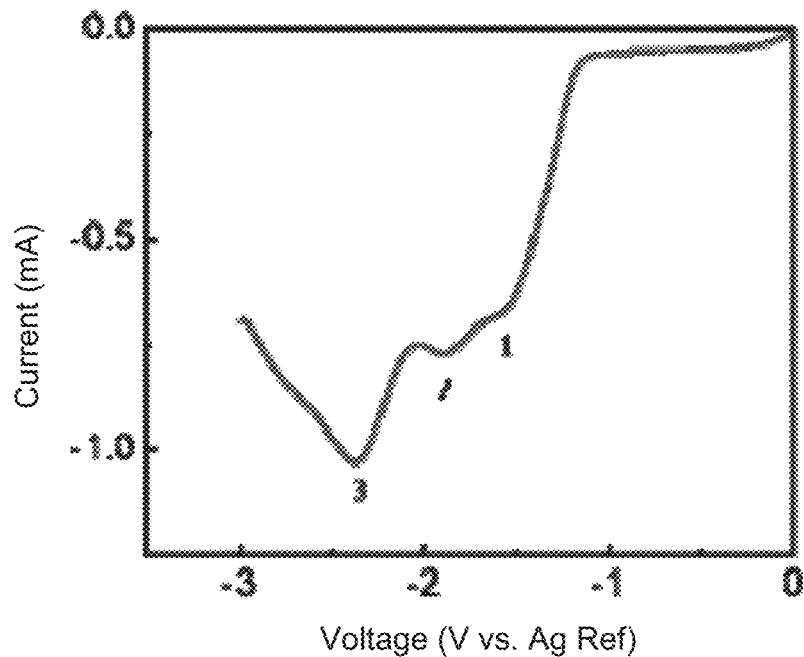
FIG. 2D
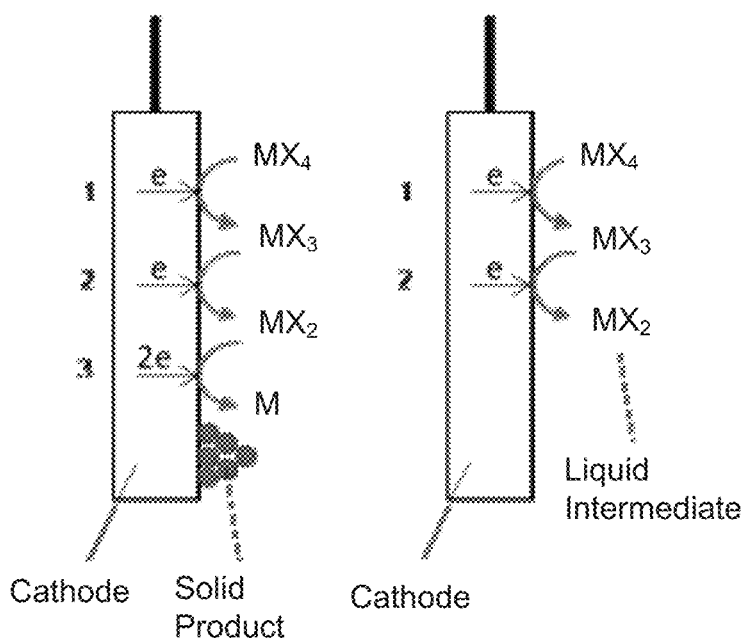
FIG. 2E    FIG. 2F

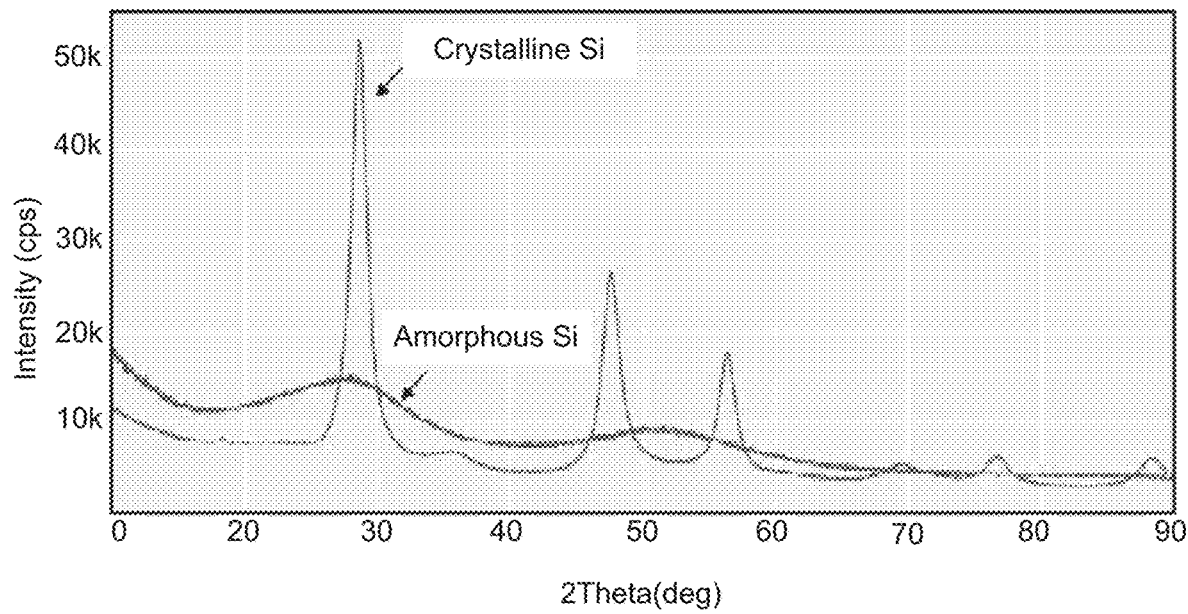
*FIG. 6A*
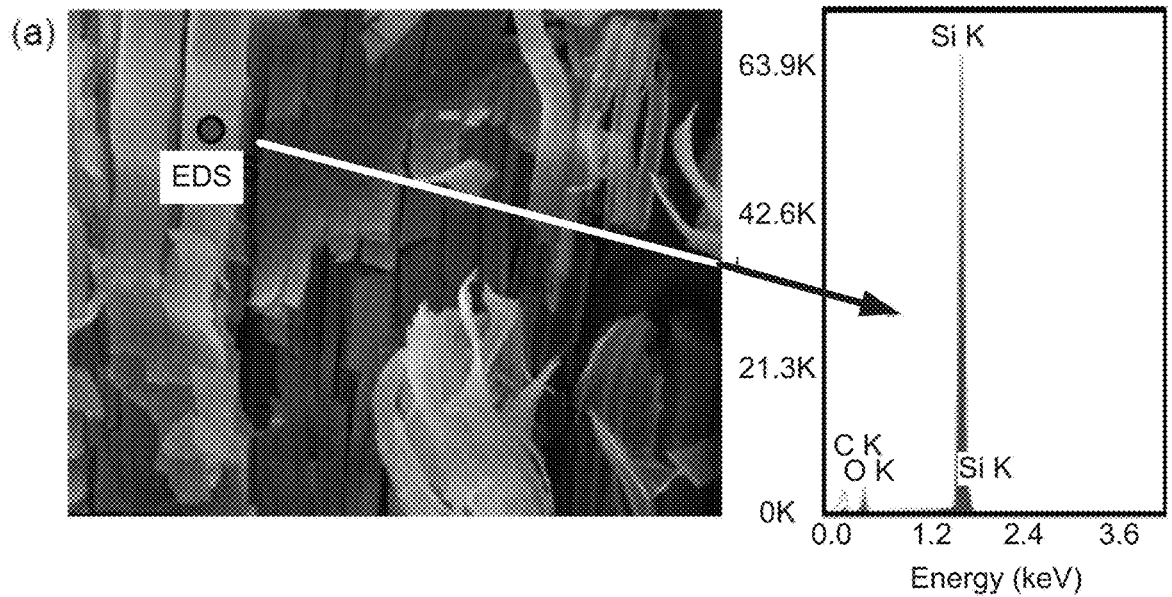
*FIG. 6B*  *FIG. 6C*

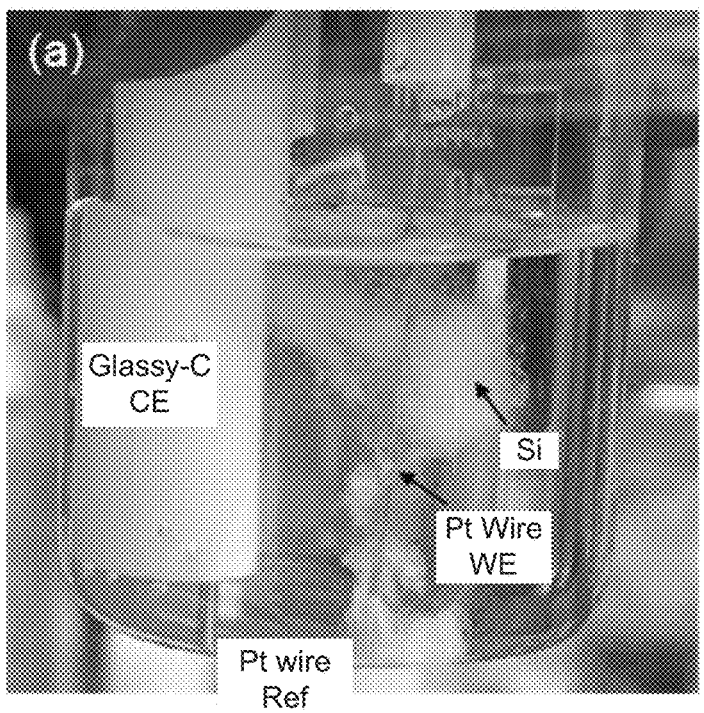 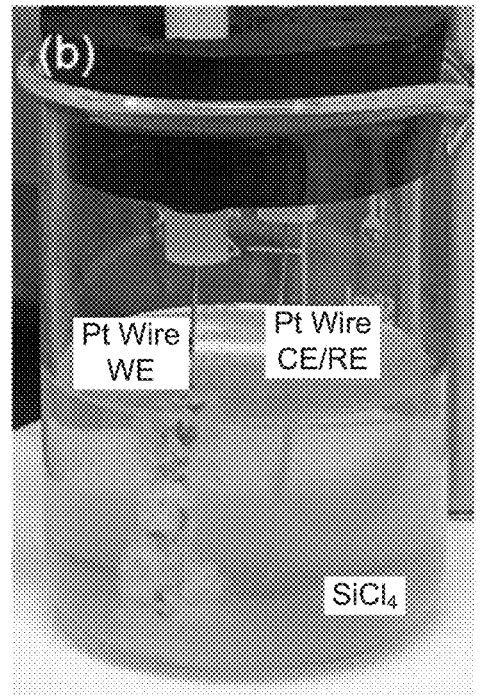
*FIG. 10A*  *FIG. 10B*

METHODS OF FORMING ACTIVE MATERIALS FOR ELECTROCHEMICAL CELLS USING LOW-TEMPERATURE ELECTROCHEMICAL DEPOSITION

CROSS-REFERENCE TO RELATED APPLICATIONS

This application claims the benefit under 35 U.S.C. § 119(e) of U.S. Provisional Patent Application 63/080,218, filed on 2020 Sep. 18, which is incorporated herein by reference in its entirety for all purposes.

TECHNICAL FIELD

The present disclosure generally relates to methods of forming active materials for electrochemical cells using low-temperature electrochemical deposition, the active materials formed using these methods, and the electrochemical cells comprising these active materials.

BACKGROUND

Silicon, germanium, and other like materials are important for many applications, such as electronic devices, solar panels, lithium-ion batteries, and grinding medium. Conventional production of these materials has been limited to high-temperature processes, such as an ingot grown from a melt and chemical vapor deposition (CVD). For example, a silicon ingot is produced using a reaction of silicon oxide and carbon at temperatures higher than the melting point of silicon (e.g., at 1414° C.). Polysilicon is produced using the distillation of volatile silicon-containing compounds and decomposition at high temperatures. A CVD typically uses a gas-phase precursor, such as silane ($SiH_4$) or silicon tetrachloride ($SiCl_4$), at a high temperature in a controlled environment to avoid potential explosion hazards. Furthermore, silicon is also produced through the decomposition of silicon oxides at high temperatures (e.g., 500-1200° C.).

These high-temperature processes require significant energy and sophisticated equipment while limiting the type of structures produced using these processes. For example, porosity and other like properties of deposited structures are difficult to control using high-temperature processes. At the same time, low-temperature deposition processes have not been developed for many electrochemical battery materials, such as negative and positive electrode active materials.

What is needed are new methods of forming active materials for electrochemical cells using low temperatures.

SUMMARY

Provided are methods of forming active materials for electrochemical cells using low-temperature electrochemical deposition, e.g., less than 200° C. Specifically, these processes allow precise control of the morphology, composition, and size of deposited structures. For example, the deposited structure may be doped, alloyed, or surface treated during their deposition using a combination of different precursors. In particular, silicon structure may be pre-lithiated while these structures are being formed. The selection of working electrodes (surface size and properties), electrolyte composition, and other parameters result in different types of structures, e.g., precipitating from the electrolyte or deposited on the electrode. Low-temperature plating does not require a lot of energy and volatile and invisible precursors. Furthermore, this plating produces a more confined waste stream, suitable for post-reaction recycling. Finally, low-temperature electrochemical deposition can be readily scaled up such that plating bathes and electrode sizes can be chosen to fit the production requirements.

BRIEF DESCRIPTION OF THE DRAWINGS

FIG. 2D is linear sweep voltammetry showing an applied voltage being lower than the silicon deposition potential but higher than the reduction potential of a corresponding precursor.

FIGS. 2E and 2F are schematic illustrations of different reduction stages during the decomposition of a precursor.

FIG. 6A illustrates the results of X-ray diffraction (XRD) analysis of electrochemically deposited silicon structures before and after annealing.

FIG. 6B is an SEM of the deposited silicon structures before annealing showing uniform agglomerates of distinct morphology.

FIG. 6C illustrates the results of energy dispersive spectrum (EDS) analysis of the sample shown in FIG. 6B.

FIG. 10A illustrates a plating solution subjected to a potential of −5 V.

FIG. 10B illustrates a plating solution subjected to a potential of −7 V.

DETAILED DESCRIPTION

Figure 1A:
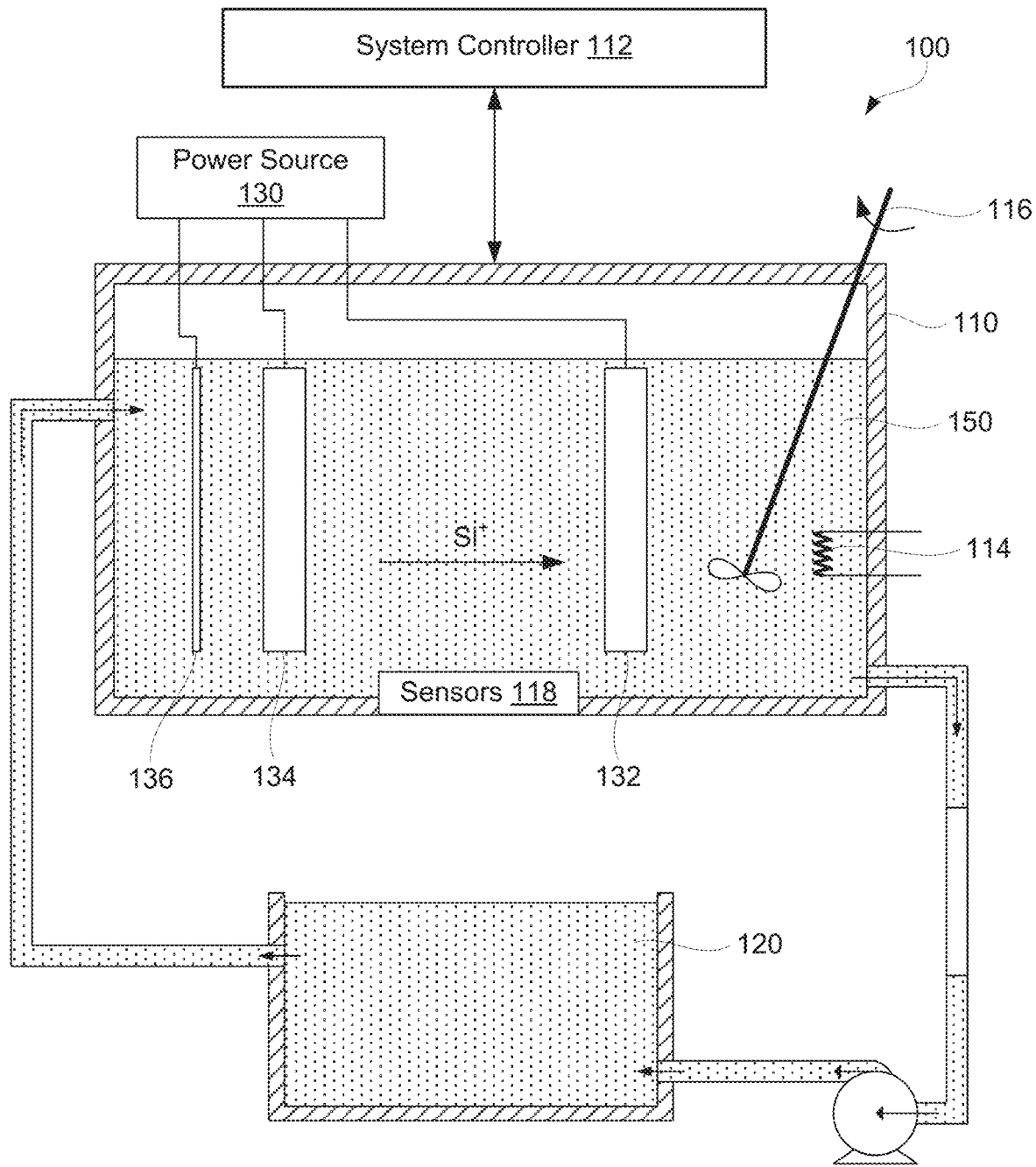
FIG. 1A is a schematic illustration of a system for low-temperature electrochemical deposition of active material structures for electrochemical cells, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

Silicon is an essential component in a wide range of applications, such as electronic devices, solar panels, lithium-ion batteries, grinding medium, and the like. Currently, silicon is produced using various complex and costly processes. Some of these processes involve high energy input (e.g., ingots grown from a melted metal pool). Other processes involve gas phase deposition (e.g., chemical vapor deposition (CVD) using silicon-containing precursors such as silane). These processes are expensive and provide minimal control over various characteristics of deposited silicon structures. One major limitation is the high temperatures needed for these conventional processes, which may also be referred to as high-temperature deposition processes. For purposes of this disclosure, a high-temperature deposition is defined as a process performed at a temperature higher than 500° C.

Forming silicon and other like structures at low temperatures (e.g., at room temperatures) is desirable and provides various levels of process control, which are not available with high-temperature deposition. For purposes of this disclosure, a "low-temperature" is defined as a temperature less than 200° C. Therefore, low-temperature deposition, described herein, is performed at less than 200° C., unlike conventional processes listed above. In some examples, low-temperature deposition is performed at less than 100° C. or even less than 50° C. such as at a room temperature of about 25° C.

One example of low-temperature deposition is a liquid-phase deposition process, which may also be referred to as plating. Specific examples of plating may be referred to as electroplating or electrodeposition. For example, liquid-phase deposition may be used to form silicon structures from one or more precursors, provided in a liquid solution. These silicon structures are formed on a harvesting substrate (e.g., a working electrode) and/or precipitate in the solution as suspended particles (which may gravitationally settle at the bottom of the deposition tank). The electrochemical potential is applied to control the deposition process, in particular, to ensure sufficiently high reaction rates at low temperatures.

Low-temperature deposition, described herein, provides unique opportunities, not available in conventional high-temperature processes, to control various characteristics of the deposited structures. Some examples of these characteristics are morphology (e.g., porosity), composition, and/or size of the deposited structures. Controllable process parameters include applied potential, working electrode (surface area, surface structure, composition, conductivity, and the like), the composition of the electroplating solution, temperature, solution agitation, and the like. Furthermore, low-temperature deposition provides for doping, alloying, and/or surface treatment using sequential deposition and/or co-deposition. For example, pre-lithiation of silicon structures may be performed while forming these structures. Traditional pre-lithiation methods usually require an added step to inject lithium into previously formed silicon structures or even after integrating these structures into negative electrodes. Additional benefits of low-temperature deposition include lower energy requirements and simpler tooling. The low-temperature deposition does not use volatile and invisible precursors and produces a more confined waste stream, suitable for post-reaction recycling. Finally, low-temperature electrochemical deposition can be readily scaled up. The bath and electrode sizes can be chosen to fit the production requirements, and the circulated solution can be supplied to maintain uninterrupted production. As such, low-temperature deposition results in high utilization of raw materials and yield.

For example, low-temperature deposition involves dissolving one or more silicon-containing precursors in one or more solvents, thereby forming an electroplating solution. Some examples of these silicon-containing precursors include trichlorosilane ($SiHCl_3$) or silicon tetrachloride ($SiCl_4$), silicon tetrabromide ($SiBr_4$), silicon tetraiodide ($SiI_4$). At least two electrodes (e.g., a working electrode and a counter electrode) are submerged into the electroplating solution. An electrical potential is applied between the electrodes, triggering electrochemical decomposition of precursors and forming silicon structures on the working electrode and/or within the solution.

However, unlike electroplating of conductive materials (e.g., Ni, Cu, Zn, Pt, and the like), electroplating of semiconductor materials (e.g., Si, Ge, and various oxides, such as $SiO$, $SnO_2$, and $TiO_2$) is a lot more challenging. When a semiconductor material is deposited on an electrode (e.g. a cathode), this material forms an insulating layer, which interferes with further deposition. The deposition rate decreases as a result of the increased impedance from the plated layer on the electrode, especially when this plated layer continues to build up and thicken. Continuous removal of the deposited semiconductor materials from the electrode is needed to minimize such passivation effect and to keep the electrodeposition process at practical production rates. Overall, there are two factors for maintaining electrodeposition rates. The first factor is the diffusivity of precursor species from the bulk electrolyte to the cathode surface. The second factor is maintaining the cathode surface substantially unchanged. For example, deposited semiconductor structures may be periodically or continuously removed from the cathode surface to maintain this surface available for further deposition.

Described methods and systems provide for continuous electrodeposition of semiconductor materials using a liquid electrolyte at low temperatures. These methods are characterized by the steady current without a typical decay, observed in conventional methods. The deposited structures may be characterized by a dispersed particulate morphology with the particle size ranging from 1 nanometer to 100 micrometers. The particle size and other characteristics (e.g., composition, porosity) may be controlled using various process conditions. The process conditioned are, in turn, more controlled at lower temperatures than, for example, conventional high-temperature depositions of semiconductor materials.

The production of semiconductor material using non-passivating electroplating in a liquid phase offers many advantages over conventional deposition methods (e.g., high-temperature depositions, gas-phase reactions). For example, this non-passivating electroplating may be performed at temperatures below 200° C., such as between 10° C. and 50° C. Lower temperature production greatly reduces energy consumption and simplifies deposition equipment, in comparison to high-temperature processes. Furthermore, liquid phase deposition provides a facile modification of the product composition. For example, multiple elements may be co-deposited to form alloy compounds. Layered structures and core-shell structures may be formed using a hybrid electrolyte and sequentially applying different deposition voltages. In a specific example, pre-lithiation of silicon structures (and/or germanium structures, tin structures) may be achieved while initially forming these structures. Pre-lithiation is considered an important feature to ensure a high cycle life of silicon-based negative electrodes in lithium-ion batteries. Another advantage is the scalability of liquid phase deposition. The bath and electrode sizes can be chosen to fit the production requirements. The circulated solution may be supplied to maintain uninterrupted production, thereby ensuring high utilization of raw materials and a high yield of products. Production safety is another important aspect and substantially improved in comparison to a gas-phase deposition. As noted above, liquid deposition uses low temperatures, does not require pyrophoric precursors, and provides confined waste streams for post-reaction processing.

Non-passivating electrodeposition is achieved based on unique combinations of precursors, solvents, and salts (collectively forming electrolytes) as well as specific electrode materials and deposition conditions. This electrodeposition method comprises three major steps: electrolysis, precipitation, and cleaning. The method is characterized by the absence of solid product formation in the first electrolysis step and by the temporarily separated solid precipitation in the second step.

In addition to electrochemical stability, the electrolyte also needs to tolerate high concentrations of halogen species (e.g., solvents being stable to halogenation reactions) to avoid or at least minimize side reactions (e.g., causing the generation of free protons, $H^+$). Other characteristics of the electrolyte solvent include the solubility of halide precursors. For example, the high volatility of organic solvents usually limits their operating temperatures and complicates their separation from the halogen produced in continuous production.

One example of suitable electrolyte components is ionic liquids. Ionic liquids are molten salts with a low melting point (e.g., around or below room temperature of 20-25° C.). Furthermore, ionic liquids are characterized by high ionic conductivity. Ionic liquids offer wide electrochemical stability windows and have low vapor pressures. Through a proper selection of the anion and cation, the chemical stability of ionic liquid may be sufficient for electrolysis applications. In some examples, ionic liquids are used in electroplating electrolytes without any organic solvents. Such electrolytes may be referred to as organic-solvent-free electrolytes.

Deposition System Examples

FIG. 1A is a schematic illustration of deposition system 100 of low-temperature electrochemical deposition of active materials for electrochemical cells, in accordance with some examples. It should be noted that electrochemical cells (e.g., batteries), in which these active materials are used, are different from system 100, in which these active materials are formed/deposited. Nevertheless, system 100 utilizes various electrochemical processes, which in many ways are similar to electrochemical cells.

In some examples, deposition system 100 comprises electroplating bath 110. Electroplating bath 110 contains electroplating solution 150 during the operation of deposition system 100. Various examples of electroplating solution 150 are described below with reference to FIG. 13. Electroplating bath 110 may seal electroplating solution 150 to prevent evaporation. Furthermore, electroplating bath 110 is connected to various other components of deposition system 100, further described below.

Deposition system 100 further comprises electrical power source 130, connected to working electrode 132 and counter electrode 134 and, in some examples, also to reference electrode 136. Working electrode 132, counter electrode 134, and reference electrode 136 are submerged into electroplating solution 150 during operation of deposition system 100. Power source 130 applies the electrical potential between working electrode 132 and counter electrode 134, which results in the electrical current between working electrode 132 and counter electrode 136. This current is caused by ions flowing within between working electrode 132 and counter electrode 134 through electroplating solution 150. For example, during low-temperature deposition of silicon, electroplating solution 150 comprises silicon ions (provided as one or more precursors). These silicon ions migrate to working electrode 132 where the silicon ions combine with electrons resulting in electrochemical deposition of silicon structures, which are precipitated in electroplating solution 150 and/or deposited on working electrode 132.

In some examples, working electrode 132 comprises or is formed from titanium (Ti), platinum (Pt), nickel (Ni), copper (Cu), stainless steel, silicon (Si) wafers, glassy carbon (glassy-C), or other metallic or semiconducting substrates. Characteristics of working electrode 132 influence the properties of deposited structures. Some of these characteristics are surface area, surface structure, composition, conductivity, and crystallographic orientation. For example, a silicon wafer having <111> orientation, used as working electrode 132, produces different types of deposited structures than a silicon wafer having <100> orientation as further described below with reference to FIGS. 5A-5D. Furthermore, using a small platinum wire as working electrode 132, coupled with high potential, results in precipitation of deposited structures right into electroplating solution 150, rather than deposition on working electrode 132. On the other hand, increasing the size of working electrode 132 shifts this precipitation in electroplating solution 150 to the deposition on the surface of working electrode 132.

A specific example of working electrode 132 includes a polished titanium plate or a stainless steel plate. However, other examples are also within the scope.

In some examples, counter electrode 134 comprises or is formed from glassy carbon (glassy-C), carbon (C), platinum (Pt), gold (Au), or silicon (Si). In general, any inert conductive materials are suitable for counter electrode 134, e.g., conductive materials that are not susceptible to electrochemical reactions with components of electroplating solution 150. In some examples, the counter electrode has a larger size than that of the working electrode.

In some examples, reference electrode 136 comprises or is formed from platinum, glassy carbon (glassy-C), or any other conductive materials that are not susceptible to electrochemical reactions with components of electroplating solution 150. Power source 130 does not apply a potential to reference electrode 136. Instead, readings obtained from reference electrode 136 (e.g., a potential between reference electrode 136 and working electrode 132) are used for controlling power source 130.

Power source 130 is configured to apply an electric potential between working electrode 132 and counter electrode 134. In some examples, the applied electric potential, from working electrode 132 perspective, is between −0.5V to −10V or, more specifically, between −1V and −5V. A lower electric potential (based on the absolute value) may be used for depositing structures on the surface of working electrode 132. A higher electric potential (based on the absolute value) may be used for precipitating structures in electroplating solution 150. In some examples, the potential is chosen based on a stable window of all chemicals in a bath including solvent, supporting electrolyte, Si-containing species, and electrodes. Counter electrode 136 is used for measuring the applied potential and provide feedback to power source 130.

In some examples, deposition system 100 comprises heater 114, for maintaining the temperature of electroplating solution 150 at between 15° C. and 200° C. For example, electroplating solution 150 may be maintained at a room temperature of 15° C.-25° C. In some examples, the deposition is performed at a slightly higher temperature can of 40° C.-60° C. in electroplating solution 150 comprising a mineral oil. When electroplating bath 110 is sealed, the temperatures up to 200° C. may be used. In general, the electroplating current is higher at a higher temperature. However, the increase in temperature may also trigger various side reactions, such as decomposition of solvents and/or supporting electrolyte salts.

In some examples, deposition system 100 comprises agitator 116. Agitator 116 is used to ensure uniformity of electroplating solution 150 throughout the entire volume of electroplating bath 110. Some examples of agitator 116 include, but are not limited to, a propeller, ultrasonic agitator, and the like.

In some examples, deposition system 100 comprises system controller 112, controlling operations of various components of system 100, such as operations of power source 130, agitator 116, heater 114, and the like. Furthermore, deposition system 100 may comprise various sensors 118, which provide output to system controller 112. In some examples, sensors 118 are configured to capture various characteristics of electroplating solution 150, e.g., temperature, conductivity, component concentrations, and the like.

In some examples, deposition system 100 comprises electroplating solution 120, which is fluidically coupled to electroplating bath 110. Electroplating solution 120 is configured to deliver electroplating solution 150 into electroplating bath 110 and to recondition electroplating bath 110. For example, solution source 120 adds depleted components and removes various reaction products.

Electroplating Solution Examples

Figure 1B:
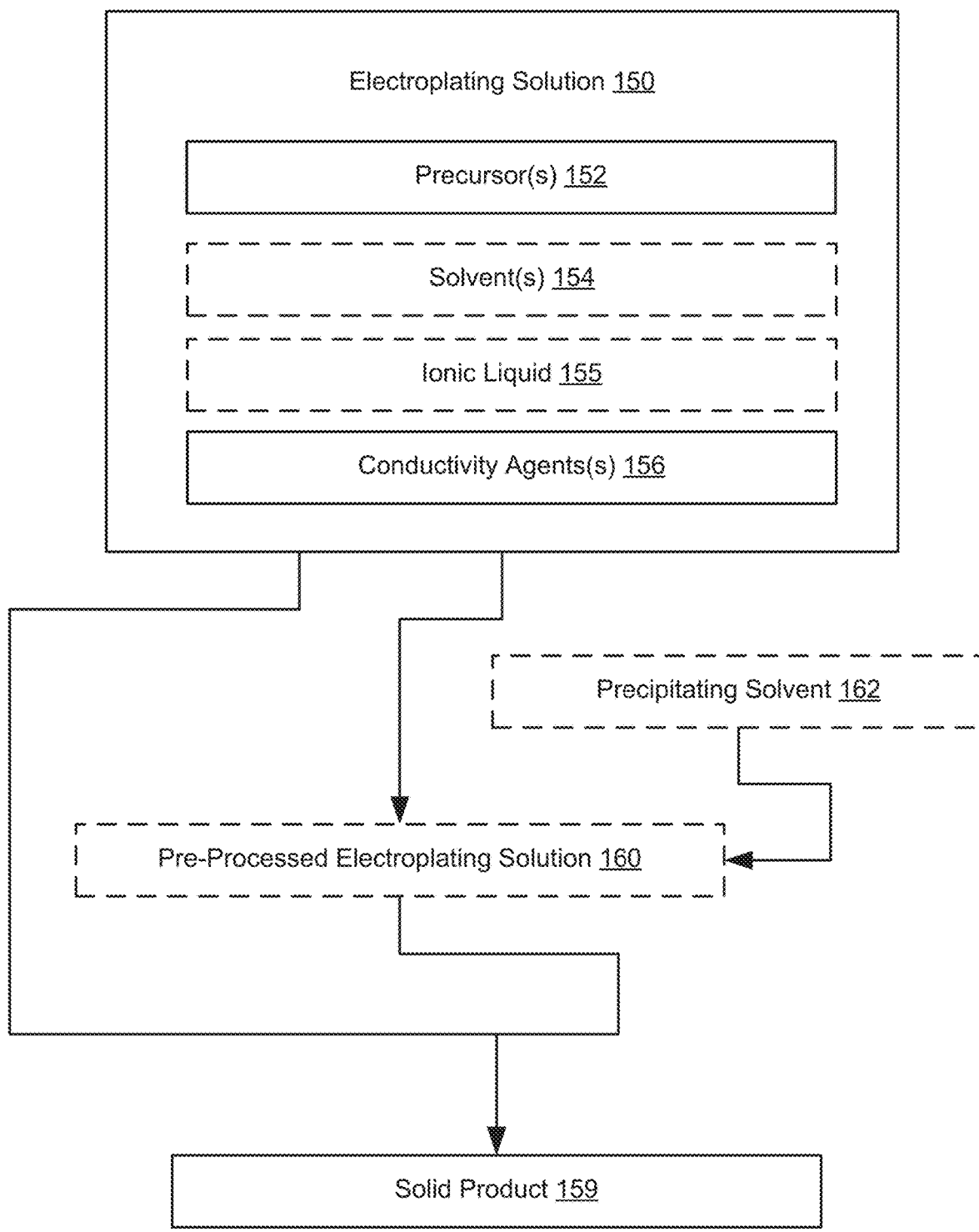
FIG. 1B is a schematic block diagram of various components forming an electroplating solution for low-temperature electrochemical deposition of active material structures for electrochemical cells, in accordance with some examples.

Referring to FIG. 1B, in some examples, electroplating solution 150 comprises one or more precursors 152 and one or more solvents 154. The overall electrolysis reaction may be presented by the following formula:

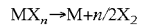

$$MX_n \rightarrow M + n/2 X_2$$

In this formula, X represents a halogen element (e.g., Cl, Br, I, or F), while M represents a metalloid or a metal element (e.g., B, Si, Ge, As, Sb, Te, Sn, Ga, Al, Mg, Li, Bi, Ta, Fe, Ni, Cu, Cr, Pt, Au, Ag).

Precursor 152 comprises one or more materials (e.g., silicon (Si), germanium (Ge), copper (Cu), nickel (Ni), iron (Fe), lithium (Li) and titanium (Ti). Some examples of precursor 152 are trichlorosilane ($SiHCl_3$), silicon tetrachloride ($SiCl_4$), boron fluoride ($BF_3$), germanium chloride ($GeCl_4$), silicon bromide ($SiBr_4$), silicon iodide ($SiI_4$), antimuonium chloride ($SbCl_5$), dichlorosilane ($H_2SiCl_2$), and hexachlorodisilane ($Si_2Cl_6$). For example, $SiBr_4$ may be more suitable than $SiI_4$ due to compound stability. Furthermore, $HSiCl_3$ has lower volatility than $H_2SiCl_2$. In some examples, electroplating solution 150 comprises a combination of two or more precursors 152, such as trichlorosilane, lithium chloride, and titanium tetrachloride. The concentration of one or more precursors 152 in electroplating solution 150 may be between 0.01M and 10M.

Some examples of solvents 154 include, but are not limited to, propylene carbonate (PC), dimethyl carbonate (DMC), tetrahydrofuran (THF), monoglyme (DME), diglyme, triglyme, tetragylme, acetonitrile, and propyl carbonate, and ionic liquids. Solvents 154 are selected to ensure that precursor 152 can dissolve at given concentrations and temperatures.

In some examples, tetrahydrofuran (THF), monoglyme (DME), diglyme, triglyme, tetragylme, acetonitrile, and/or propyl carbonate are used as a solvent in electroplating solution 150. Without being restricted to any particular theory, it is believed that these solvent examples provide good solubility to precursors 152 and are stable during electrodeposition conditions (e.g., voltage, current) described below.

In some examples, electroplating solution 150 comprises one or more conductivity agents 156, such as tetrabutylammonium chloride (Bu$_4$NCl), tetrabutylammonium bromide (Bu$_4$NBr), tetrapropylammonium chloride (Py$_4$NCl), tetraethylammonium chloride (Et$_4$NCl), and lithium chloride (LiCl), 1-Butyl-1-methylpyrrolidinium chloride (PYR$_{14}$Cl), 1-Propyl-1-methylpyrrolidinium chloride (PYR$_{13}$Cl), and other soluble salts. Unlike precursor 152, conductivity agents 156 do not participate in electrochemical reactions, but provide non-reacting ions, e.g., chloride, to support ionic transport within electroplating solution 120. In some examples, the molar ratio between conductivity agents 156 and precursor 152 is between 1:100 to 100:1. In the same or other examples, the concentration of conductivity agents 156 in electroplating solution 150 is between 1 mmol/L to 10 mol/L.

In some examples, additional non-reactive ionic liquid is added to electroplating solution 150, e.g., to avoid the conductivity drop due to the consumption of ionic species. Examples of these ionic liquid species include, but are not limited to, 1-Ethyl-3-methylimidazolium bis(trifluoromethylsulfonyl)imide (EMIMTFSI), 1-Butyl-1-methylpyrrolidinium bis(trifluoromethanesulfonyl)imide (BMPTFSI), 1-propyl-1-methylpyrrolidinium bis(trifluoromethanesulfonyl)imide (PMPTFSI), or 1-Butyl-3-methylimidazolium tetrafluoroborate (bmimBF$_4$).

In some examples, electroplating solution 150 is pre-processed to form pre-processed plating solution 160 as further described below. Precipitating solvent 162 may be then added to pre-processed plating solution 160 to form solid product 159. Some examples of precipitating solvent 162 include dimethyloxyethane, tetraglyme, triglyme, diglyme, monoglyme, and tetrahydrofuran (THF).

Processing Examples

Figure 2A:
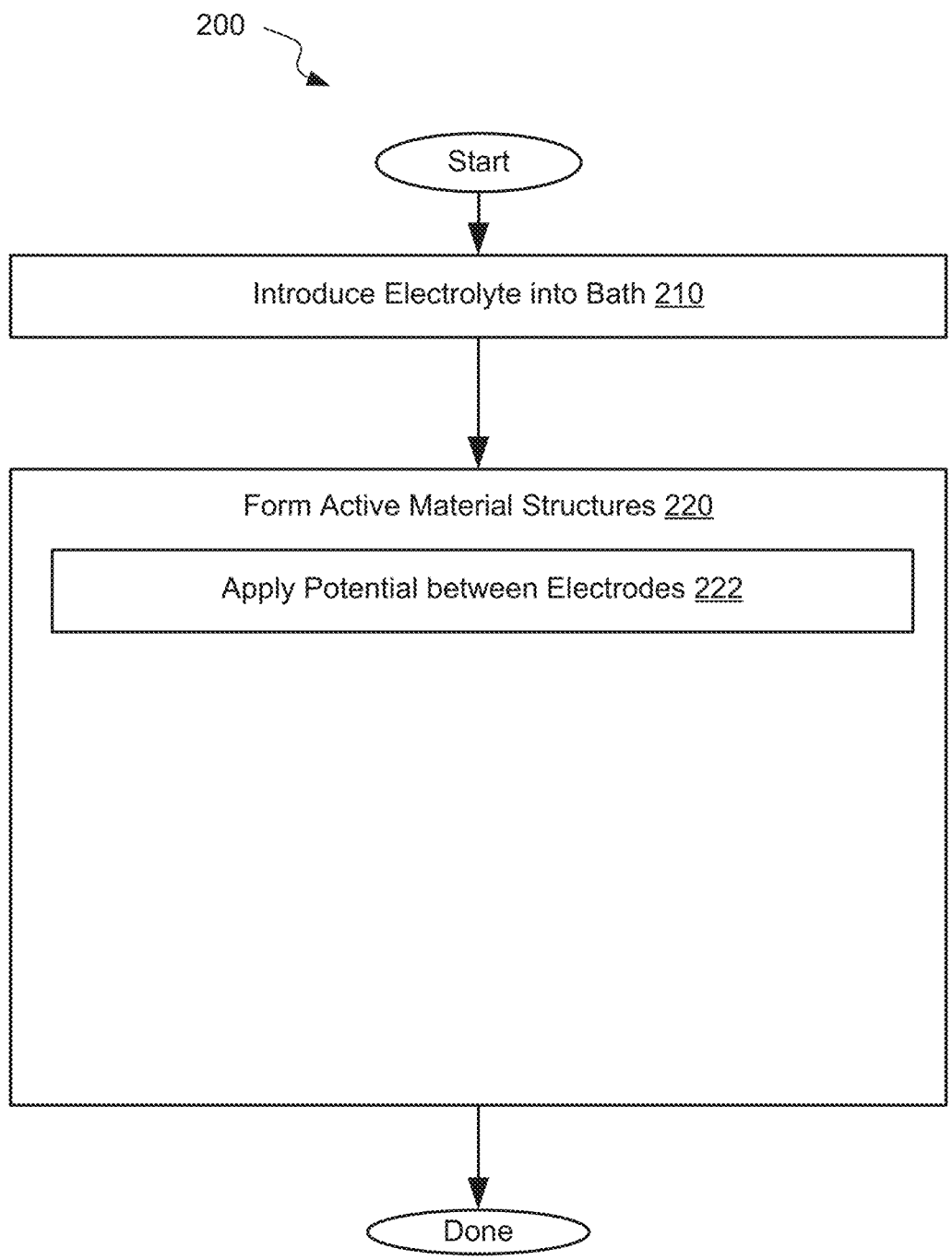
FIG. 2A is a process flowchart of a method for low-temperature electrochemical deposition of active materials for electrochemical cells, in accordance with some examples.

FIG. 2A is a process flowchart corresponding to method 200 of forming active materials for electrochemical cells using low-temperature electrochemical deposition, in accordance with some examples. Some examples of these active materials include, but are not limited to, silicon, silicon monoxide, silicon carbide, germanium, gallium nitride, and tin, tin oxide, and aluminum.

In some examples, method 200 is based on a non-passivating wet electrochemical deposition. Specifically, a halide precursor is dissolved in a primary solvent and, in some examples, an ionic-conductivity additive, collectively forming electroplating solution 150. The precursor is then electrochemically reduced when a potential is applied between working electrode 132 and counter electrode 134.

FIG. 2A is a process flowchart corresponding to method 200 of forming active materials for electrochemical cells using low-temperature electrochemical deposition, in accordance with some examples.

Method 200 comprises introducing electroplating solution 150 into electroplating bath 110 (referring to block 210 in FIG. 2A). Various examples of electroplating solution 150 and electroplating bath 110 are described above. Electroplating solution 150 may be maintained at a temperature of between 10° C. and 200° C. Various temperature considerations are described above.

Method 200 then proceeds with forming active material structures (referring to block 220 in FIG. 2A). An electrical potential is applied between working electrode 132 and counter electrode 134 (referring to block 222 in FIG. 2A). Various examples of working electrode 132 and counter electrode 134 are described above. Furthermore, various examples of electrical potentials and their effects on the formed active material structures are described above.

In some examples, working electrode 132 is a polished titanium plate, while counter electrode 134 is a polished Glassy-C electrode. The applied electrical potential is −2.5 V (versus reference electrode 136). The current density may be about 1 mA/cm². The current density decreases as Si is deposited onto the working electrode, which increases the impedance.

In some examples, working electrode 132 is a complex substrate (e.g., nickel foam) such that a conformal silicon coating is formed on the surface of this substrate. A patterned substrate, such as a conducting substrate with insulating mask patterns, can also be used to deposit silicon onto specific areas and make electrodes.

Non-Passivating Deposition Examples

Figure 2B:
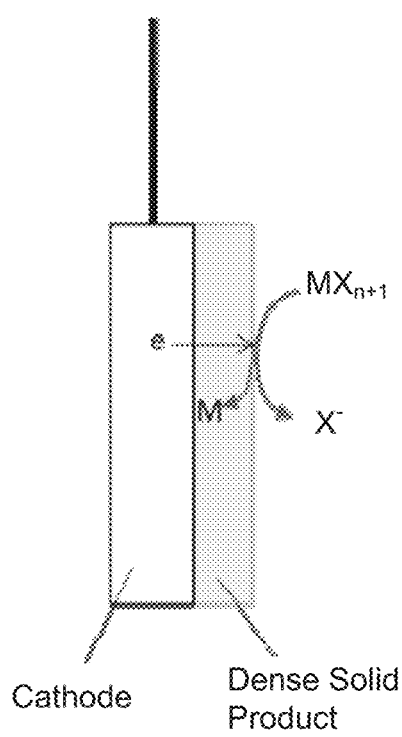
FIGS. 2B and 2C are schematic illustrations of different electrochemical deposits.

In some examples, non-passivating deposition is achieved by reducing the adhesion of the solid product to the surface of the working electrode. The electrodeposition occurs where electrons and precursor ions (e.g., Si$^{+4}$) jointly meet, e.g., at the interface of the working electrode and the electrolyte. If a dense structure (e.g., of semiconductor material) is deposited on a working electrode as, e.g., is schematically shown in FIG. 2B, then this deposited structure impedes further electron transport to the electrolyte interface, effectively causing the passivation effect. For purposes of this disclosure, a "dense" structure is defined as a structure with porosity less than 40% or less than 30% or even less than 20%.

Non-passivating deposition, described herein, uses various processing conditions (e.g., specific compositions of electroplating solutions) to prevent the formation of dense structures on the working electrode. In some examples, non-passivating deposition relies on the steric surfactant effect of the electroplating solution. For example, the composition and characteristics of the electroplating solution are selected such that the metalloid precursor is present in the anion rather than in the cation, as represented by the following formula:

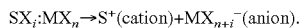

Figure 2C:
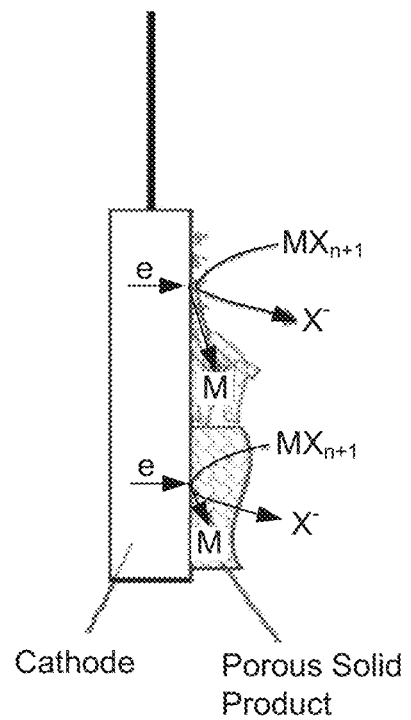

With the application of a negative potential on the cathode, the space charge layer (in the electrolyte and near the cathode surface) is occupied by positively charged S$^+$ cation as, e.g., is schematically shown in FIG. 2C. This layer (of adsorbed S+ cations) acts as a surfactant, which reduces the adhesion of the deposited solid product (derived from the anions). The anions are driven to the cathode by the chemical diffusion, e.g., due to the concentration gradient.

In some examples, non-passivating deposition relies on a specific solvent system, enables a high diffusivity of the reactant through the solvent or, more specifically, through the solution. For example, various examples of solvents listed above (e.g., DME) are miscible with precursors (e.g., SiCl$_4$). Therefore, the concentration of redox-active species (e.g., Si$_2$Cl$_9^-$, SiCl$_5^-$) in the electroplating solution is high, e.g., greater than in propylene carbonate (PC). Such a high concentration facilitates the diffusion of the redox-active species both from the bulk electrolyte to the near-surface of the electrode and through the porous solid product layer, previously deposited on the cathode surface. Therefore, the current degradation resulting from the diffusion factor is also minimized.

In some examples, the removal of deposited structures from the cathode is assisted by the flow of electroplating solution 150 around the cathode (e.g., by agitating electroplating solution 150 within electroplating bath 110). It should be noted that the deposited structure is highly porous, e.g., with the porosity being at least about 30% or even at least about 20%. Furthermore, the deposited structures are loosely attached to the cathode due to the surfactant effect of $Bu_4N^+$ cation. Overall, the facile removal of the deposited structures helps to maintain a large active surface area of the cathode.

In some examples, the composition of electroplating solution 150 is such that electroplating solution 150 has high stability in a deposition window, defined by various deposition parameters, such as temperature, voltage, internal resistance, and chemical stability. For example, solvents 154 and conductivity agents 156, listed above, are stable as the deposition potential (e.g., −2V to −6V vs. the anode). This stability results in fewer side reactions that generate undesired solid products. These undesired solid products may passivate the cathode surface and degrade electroplating solution 150 (e.g., reduce the ionic conductivity).

In some examples, trace amounts of chlorine species (e.g., elemental chlorine, chlorine gas, $Cl_2$) help to regenerate the cathode surface. The trace amounts may be in the range of 10 ppm to 100,000 ppm or, more specifically, in the range of 100 ppm to 10,000 ppm or even between 100 ppm and 1,000 ppm. Specifically, in these examples, the anode reaction is the oxidative generation of chlorine. When the chlorine concentration gets to a substantially high level (e.g., at least about 1% or even at least about 0.1%), some chlorine passes through the porous membrane into the cathode chamber. This chlorine partially reacts with the cathode surface and/or the solid product. While this reaction is undesirable from the product yield and composition of the resulting structures, this reaction helps with the detachment of the deposited products.

Multistage Deposition Examples

In some examples, the overall cathode reaction involves multiple stages. A two-stage example is represented by the following formulas:

$$MX_n + 2e \rightarrow MX_{n-2} + 2X^-$$

$$MX_{n-2} + 2e \rightarrow M(\downarrow) + (n-2)X^-$$

In this general formula, X represents a halogen (e.g., Br, I, or F), while M represents a metalloid or a metal element (e.g., B, Si, Ge, As, Sb, Te, Sn, Ga, Al, Mg, Li, Bi, Ta). For example, when silicon tetrachloride ($SiCl_4$) is used as precursor 152, the two-stage deposition example is represented by the following formulas:

$$SiCl_4 + 2e \rightarrow SiCl_2 + 2Cl^-$$

$$SiCl_2 + 2e \rightarrow Si(\downarrow) + 2Cl^-$$

By controlling the voltage between the electrodes in the electroplating apparatus, different stages of the overall process can be decoupled. This decoupling allows forming intermediate products (e.g., silicon dichloride) without depositing silicon structures on the cathode surface. As such, after completing the first stage, in the above example, and before proceeding with the second stage, electroplating solution 150 remains a homogenous liquid comprising silicon ions ($Si^{2+}$). This electroplating solution 150 may be referred to as a pre-processed electroplating solution.

Solid silicon structures are then precipitated from this pre-processed electroplating solution by adding a deposition promoter. This addition results in the following disproportionation reaction:

$$SiCl_2 \rightarrow Si(\downarrow) + 2SiCl_4$$

It should be noted that this disproportionation reaction is not a part of the electrochemical reaction caused by the electronic flow between the electrodes.

To ensure this multistage operation, in some examples, the molar ratio between conductivity agent 156 and precursor 152 is greater than 1 or greater than 2 or even greater than 2:1. Conductivity agent 156 serves multiple purposes in this multistage deposition. First, the addition of conductivity agent 156 to electroplating solution 150 increases the ionic conductivity of electroplating solution 150. Second, conductivity agent 156 promotes the ionization of precursor 152 (e.g., metalloid halides) by donating free halide ions to form loosely bonded $MX_{n+1}^-$ anion species. This, in turn, facilitates the reduction of $MX_n$ during the initial stage of the multistage deposition. Third, conductivity agent 156 is operable as a cationic surfactant, which promotes the suspension of, if any, nano-Si solid deposit. This suspension helps to remove the solid deposit to detach from the electrode surface, preventing the surface passivation of the electrode by insulating solid deposits. Furthermore, the low solubility of conductivity agent 156 alone in solvent 154 provides the precipitation mechanism for extracting the final deposition product (e.g., solid silicon). Since the addition of solvent 154 will change the solvation structure of the solute species, breaking the surfactant effects and promotes the solution-precipitation balance to the precipitation side.

In some examples, the voltage (magnitude) applied between the electrodes of the electroplating apparatus is lower than the M deposition potential, but higher than $MX_n$ reduction potential. In fact, the reduction of $MX_n$ to M can take several intermediate steps for various examples of M. With a three-electrode configuration and a dilute concentration of the solute, which may also be referred to as a precursor, these steps can be seen in linear sweep voltammetry as, e.g., is shown in FIG. 2D. When the voltage is scanned from 0V to −3V, three reduction peaks are observed and noted sequentially as 1, 2, and 3. Each r peak corresponds to an electrochemical reduction stage. These stages are schematically shown in FIGS. 2E and 2F. FIG. 2E represents a three-stage example. One having ordinary skill in the art would understand that this example may deviate for various precursors and process conditions. For example, $Si^{3+}$ ions can exist in the form of $SiCl_3$, $Si_2Cl_6$, $Si_2Cl_7^-$, $Si_2Cl_5^+$, $SiCl_2^+$, and other like species. For simplicity, $SiCl_3$ is used to represent all $Si^{3+}$ containing intermediates in this example. Similarly, $SiCl_2$ is used as the representation for $Si^{2+}$ containing intermediates, such as $Si_2Cl_4$, $SiCl_4^{2-}$, $SiCl^+$, $SiCl_3^-$, etc. By properly controlling the reduction voltage and the extent of reduction, the reaction may be limited to the first two reduction steps as, for example, schematically shown in FIG. 2F. The extent of this reduction is controlled by counting the total charge passed to the system, e.g., 50% depth of charge results in mainly 2+ species, 25% depth of charge results in mainly 3+ species. Limiting the reduction allows maintaining soluble species (e.g., $MX_2$) in the pre-processed electroplating solution without generating insoluble species (e.g., M).

In some examples, a flow of electroplating solution 150 (e.g., by agitating electroplating solution 150) over the cathode surface is used to ensure sufficient reactant influx and removal of intermediate reaction products. Overall, the flow of electroplating solution 150 helps to maintain the separation between different stages of the multistage deposition process. Agitation, such as stirring or sonication, can effectively carry away the soluble product ($MX_3$, $MX_2$) and transport fresh reactant ($MX_4$) to the electrode surfaces. Without sufficient mass transport, the last step of solid deposition may take place, when the local concentration of $MX_4$ dramatically decreases while $MX_2$ increases dramatically.

Figure 2G:
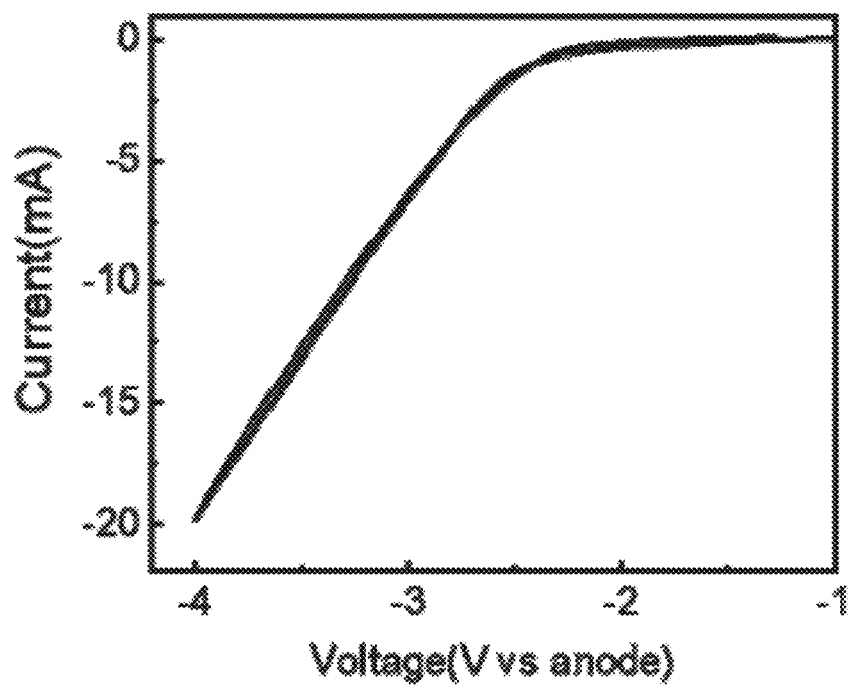
FIG. 2G represents a cyclic voltammetry scan of a stainless-steel cathode vs. a graphite anode in a solution comprising of silicon tetrachloride ($SiCl_4$), tetrabutylammonium chloride (TBACl), and dimethyl ether (DME).
Figure 2H:
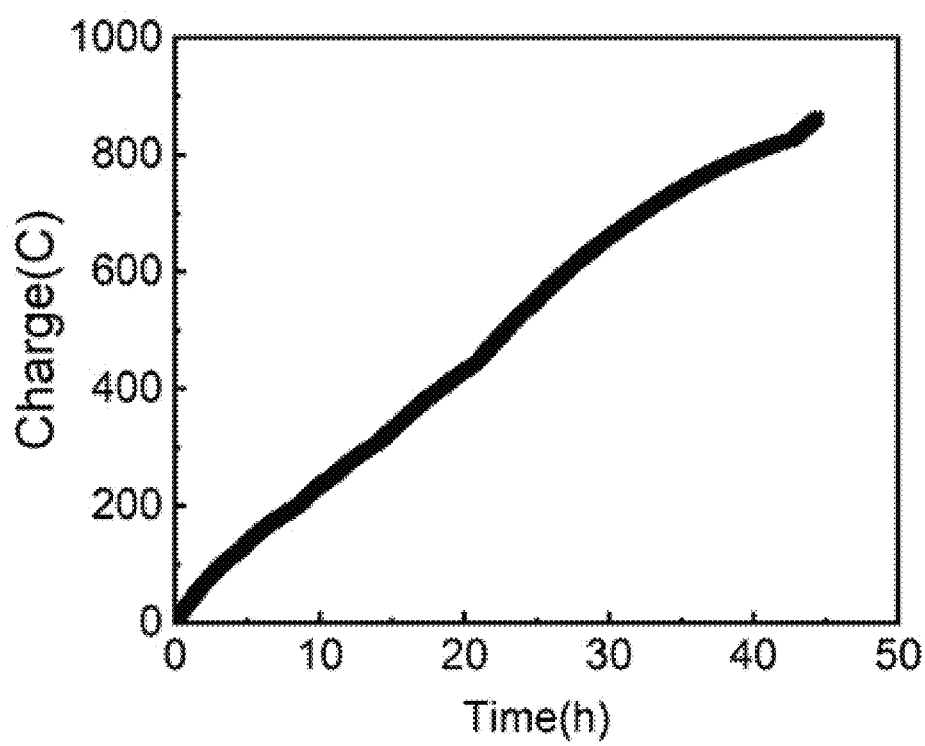
FIG. 2H illustrates an accumulated charge profile of the continuous electrolysis of a two-electrode system for 45 hours with continuous agitation.

Various examples of solvents 154 (used electroplating solution 150 and listed above) are stable during the cathodic reactions (e.g., voltages between about 0V and −3V vs standard hydrogen electrode). Some examples of these solvents are tetraglyme, triglyme, diglyme, monoglyme, or tetrahydrofuran. Other types of solvents, such as propylene carbonate, tend to decompose and/or participate in various side reactions, such as the formation of carbon. Furthermore, these stable solvents tend to be miscible with various examples of precursors 152 (shown as $MX_4$). For example, $SiCl_4$ is miscible in DME, but only partially soluble in propylene carbonate. The miscibility allows for high concentrations of redox-active species in electroplating solution 150. In some examples, this concentration is at least about 0.1M and even at least about 2M. This high concentration of redox-active species is evident from linear sweep voltammetry for an electroplating solution. More specifically, FIG. 2G represents a cyclic voltammetry scan of a stainless-steel cathode vs. a graphite plate anode in a $SiCl_4$-TBACl-DME solution from −2 V to −4 V. In this example, the reduction current increases linearly as the voltage is between −2.5 V to −4V. This linear increase indicates that an electrochemical reductive reaction proceeds without diffusion limitation within the electroplating solution and without the passivation of the electrodes. The intermediate steps in this solvent system can only be revealed with intentionally low concentration or fast scanning rate to induce diffusion limitation. FIG. 2G also illustrates a successfully reductive reaction of the metalloid halide on the cathode when more negative than −2.5 V is applied. FIG. 2H illustrates an accumulated charge profile of the continuous electrolysis of a two-electrode system for 45 h with continuous agitation. The applied potential between the cathode (a graphite plate) and the anode (a stainless steel mesh) was −3.5 V. More specifically, FIG. 2H demonstrates that the deposition can continuously happen, without passivation. The passivation reduces the electrolysis current, which will eventually approach the zero level.

The precipitation of the final product (e.g., M) from the pre-processed electrolyte (comprising, e.g., $MX_2$) is triggered by adding a solvent, which has a low solubility for the electrolyte salt alone. This solvent-additions provides a driving force to break the ionized $MX_2$ species when the extra solvent is added, based on the following reaction:

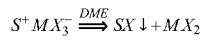

The liquid intermediate is stable in the ionized form but will disproportionate in the free-standing form (i.e., as $MX_2$ in the above formula). As shown in the following formula, the free-standing form will disproportionate into M and $MX_4$, driven by the crystal energy of the M and the solvation energy of $MX_4$ by the organic solvents.

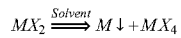

Examples of Solvent-Free Electrolysis

In some examples, molten salt electrolyte systems are used for the electrodeposition of various materials. Some examples of deposited materials include battery negative active materials, such as silicon, silicon monoxide, titanium silicide, or silicon aluminide. Molten salt electrolyte systems use low temperatures, such as less than 100° C., less than 60° C., or even less than 40° C. Molten salt electrolyte systems may also be referred to as solvent-free electroplating solutions. As shown in FIG. 1B, in these examples, electroplating solution 150 comprises precursor 152 and ionic liquid 155, which replaces solvents 154. Ionic liquid 155 is stable to halogens and comprises an anion, such as $AlCl_4^-$, $BF_4^-$, $PF_6^-$, $FSI^-$, $TFSI^-$, $Br_3^-$, and a cation, such as one belonging to a chemical group of alkyl quaternary ammonium (e.g., $BMP^+$, $N_{4444}^+$, $PMP^+$, and the like). It should be noted that ionic liquid with anions, in the form of aromatic rings and unsaturated C—C bonds are not suitable here to the chemical reaction of chlorination to these unsaturated chemical bonds.

In such systems, a metalloid halide precursor reacts with another additive (e.g., butylmethylpyrrolidinium chloride—BMPCl) to form an ionic liquid mixture. Such a mixture is then electrochemically decomposed by applying a potential to the electrodes immersed in this plating solution. In the ionized format, the metalloid halide can be either in anion (e.g. $[S]^+[MX_{n+i}]^-$) or cation (e.g. $[MX_{n-1}]^+[AX_{i+1}]^-$). The ionic liquids and any other additives to electroplating solution 150 are not electrochemically active. As such, the net reaction during the electrolysis is represented by the following formula:

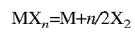

$MX_n = M + n/2 X_2$

In this formula, X represented one of Cl, Br, I, or F, while M represents one of B, Si, Ge, As, Sb, Te, Sn, Ga, Al, Mg, Li, Bi, Ta, and the like.

A Lewis acid-base reaction causes the formation of ionic liquid-like compounds. In a solvent-free plating solution, an ionic compound with a low melting point is formed. For example, introducing a bulky cation to a bulky anion forms such ionic compounds. For purposes of this disclosure, a "bulky" cation is defined as a cation having an ionic radius of greater than 0.1 nanometers (or greater than 100 picometers). For example, $Bu_4N^+$ has an ionic radius of about 0.41 nanometers, $Me^4N^+$ has an ionic radius of about 0.28 nanometers, while $K^+$ has an ionic radius of 138 nanometers. In some examples, ionization of $SiCl_4$ may be achieved using Lewis acids (that can abstract $Cl^-$) or nucleophile agents (that can donate $Cl^-$) as presented by the following formula:

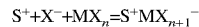
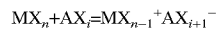

The removal of deposited solid products from a cathode is achieved by a surfactant effect, provided by a cation, such as $BMP^+$, $N_{4444}^+$, and $PMP^+$. When a negative potential is applied on the cathode, the stern layer (of the electric double layer) at the cathode surface will be occupied by these positively charged cations (due to static charge, the upper part of FIG. 2C). These ions are inert within the electrochemical window. As such, these ions will remain at the cathode surface without reaction. At the same time, the silicon source is provided from an anion, (e.g. $SiCl_5^-$). These anion species will not be able to form direct contact will the electrode surface due to the steric surfactant effect by the previously mentioned cations in the stern layer. As such, the bonding between the cathode surface and the deposited product is reduced. This lack of bonding facilitates the removal of the deposited product.

Furthermore, continuous agitation helps with the mechanical removal of solid products, e.g., to prevent passivation and to control the product particle size. Despite the surfactant effect, the product needs to be promptly removed from the cathode surface, to allow unobstructed diffusion of new reactants to the cathode and to prevent the transport limitations and passivation of the cathode. With the surfactant effect, gentle mechanical agitation methods, such as sonication or stirring, may be used. Also, the interval of agitation can be used to regulate the particle size of the product. Specifically, this interval controls the growth duration before particles are detached from the cathode surface, thereby controlling the particle size. In some examples, the agitation intervals are between 1 millisecond and 1 hour or, more specifically, between 0.1 seconds and 60 seconds.

In some examples, a secondary inert ionic liquid is added to maintain continuous operation, e.g., to maintain the ionic conductivity. This aspect is achieved by increasing the degree of ionization through cation-anion interaction, rather than solvation (as in the case with organic solvents). For example, the primary ionic liquid is $TBA^+SiCl_5^-$, while the secondary inert ionic liquid is BMPTFSI. Other examples of suitable secondary inert ionic liquids include, but are not limited to, the cations from the list of $Bu_4N^+$, $Et_4N^+$, $Me_4N^+$, $BMP^+$, $EMIM^+$, and anion from the list of $AlCl_4^-$, $BF_4^-$, $PF_6^-$, $FSI^-$, $TFSI^-$, and $Br_3^-$. The concentration of the secondary inert ionic liquid in electroplating solution 150 is between 1% and 1000% or, more specifically, between 10% and 100%.

Forming various materials, such as silicon, using solvent-free electrolysis provides various advantages and benefits. For example, solvent-free electrolysis may be performed at temperatures between 10° C. and 50° C., which greatly reduces the overall energy consumption and simplifies the deposition apparatus design. Solvent-free electrolysis also provides a facile modification of the product composition. For example, multiple elements may be co-deposited to form various alloy compounds. Layered structures and core-shell structures may also be produced, e.g., when different deposition voltages are applied sequentially. Specifically, the pre-lithiation of silicon structures may be achieved while forming these silicon structures. Pre-lithiation is an important feature to improve the cycle life of lithium-ion batteries. Furthermore, solvent-free electrolysis can be easily scaled up. The solution tank and electrode sizes are selected for specific production requirements. A circulated solution is supplied to maintain uninterrupted production. This leads to the high utilization of raw materials and yield. Solvent-free electrolysis allows improving the safety of production, in comparison, with gas-phase depositions. Specifically, solvent-free uses lower deposition temperature, does not requires pyrophoric precursors, and provides a confined waste stream for post-reaction processing. Furthermore, extremely low vapor pressures of ionic liquids enable the facile halogen removal from the anode chamber by distilling. After this degassing operation, the used electrolyte may be recycled to an electrolyzer for continuous operation. The high-temperature stability of this solvent-free electrolyte can also extend the stable operating temperature window of the electrolysis. Furthermore, the chemicals utilized in this invention are featured by a wide electrochemical stability window and high chemical stability toward the halogens during the process. Therefore, the chemical can support long-term operation with little degradation. Finally, all these factors lead to a potential overall low-cost production of Si particles.

Examples of Active Material Structures

Figure 3A:
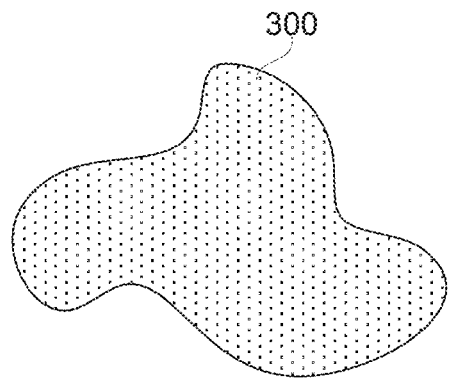
FIGS. 3A and 3B are schematic illustrations of different examples of active material structures, electrochemically deposited at low temperatures.
Figure 3B:
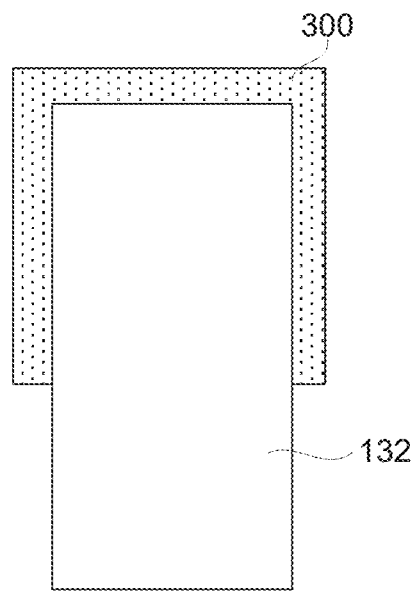

FIGS. 3A and 3B illustrate various examples of active material structure 300 formed using low-temperature electrochemical deposition. Specifically, FIG. 3A illustrates active material structure 300 as a standalone structure, which may be formed by precipitating in electroplating solution 150. FIG. 3B illustrates active material structure 300 as a coating over working electrode 132, which may be used as a current collector substrate.

In some examples, active material structure 300 comprises silicon (Si), germanium (Ge), copper (Cu), nickel (Ni), iron (Fe), titanium (Ti), and various combinations thereof, such as Si—Ge or Si-Me, where Me represent one or more metals (e.g., lithium (Li), aluminum (Al), Titanium (Ti), copper (Cu), nickel (Ni), and iron (Fe), and the like). Other examples include silicon monoxide (SiO), silicon suboxide (SiOx), silicon carbide (SiC), which are suitable as active materials for negative electrodes in lithium-ion batteries. In some examples, active material structure 300 comprises silicon (Si) and lithium (Li), which may be referred to as pre-lithiated silicon. Introducing lithium into silicon may be used to compensate for irreversible trapping of lithium in active materials structures, during the operation of the electrochemical cell.

In some examples, active material structure 300 comprises a core and a shell, such that the shell has a different composition or structure from the shell.

In some examples, thin and two-dimensional sheets are produced by electrodeposition or by pulsed deposition. Such sheets generally cannot be formed using a high-temperature CVD process. This limitation is due to the intrinsic anisotropic nature of electrochemical deposition based on the current direction.

Examples of Electrode and Electrochemical Cells/Applications

Figure 4A:
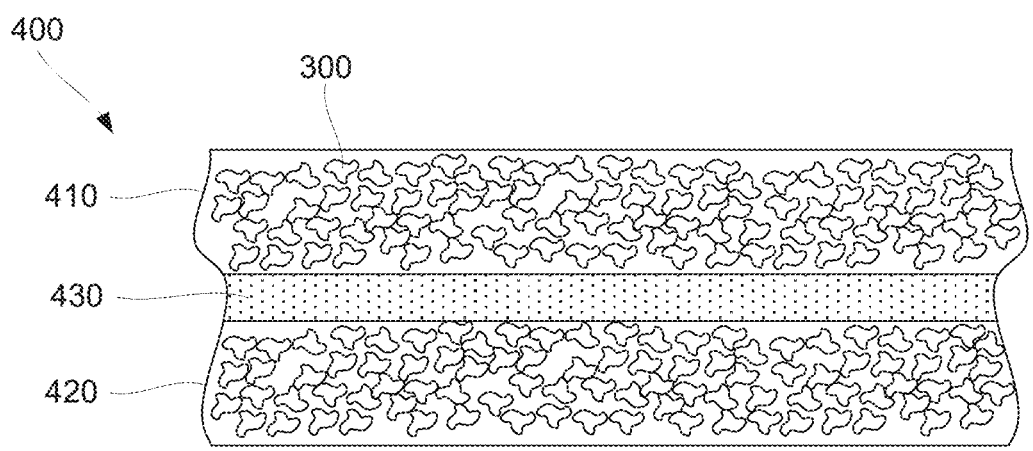
FIG. 4A is a schematic illustration of an electrode, comprising active material structures formed using low-temperature electrochemical deposition, in accordance with some examples.

In some examples, electrodeposited negative active materials, are used in an electrode of an electrochemical cell. FIG. 4A is a schematic illustration of electrode 400, comprising current collector 430, first active layer 410, and, optionally, second active layer 420. In this example, the first active layer 410 and second active layer 420 are supported by current collector 430, which also provides electric communication between first active layer 410 and second active layer 420 and other components of the cell. In some examples, current collector 430 is a working electrode of system 100, described above with reference to FIG. 1A.

One or both first active layer 410 and second active layer 420 may comprise active material structures 300. Active material structures 300 are configured to receive and release ions during the cycling of the electrochemical cell. Furthermore, active material structures 300 may be used as conductive additives. In these examples, first active layer 410 and second active layer 420 comprise other active materials. Furthermore, in these examples, the amount of conventional conductive additives (e.g., Carbon Black, Super P) used in first active layer 410 and second active layer 420 may be reduced or eliminated. In some examples, active material structures 300 are used as ionic sources (e.g., lithium source) to compensate for ionic losses in the cell (e.g., to form an SEI layer). First active layer 410 and second active layer 420 may comprise a binder, other active materials, and/or other conductive additives in addition to active material structures 300.

Figure 4B:
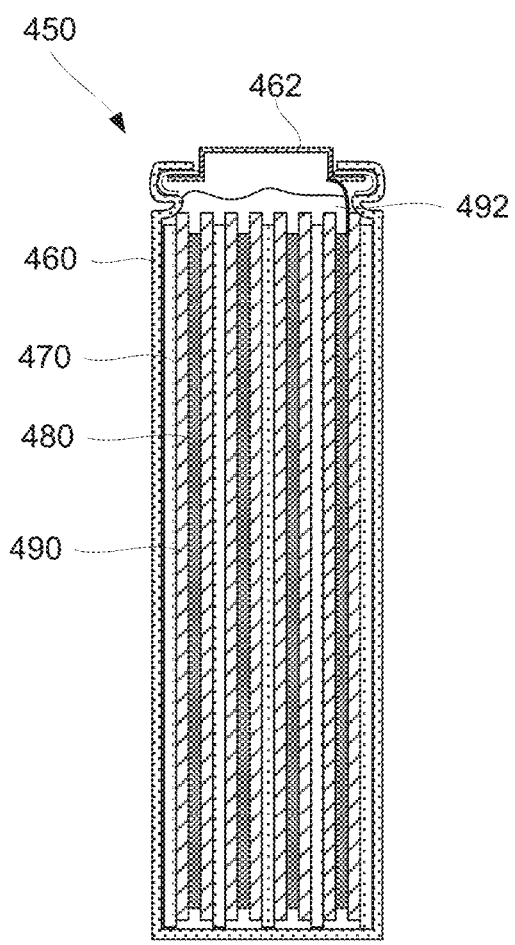
FIG. 4B is a schematic illustration of an electrochemical cell comprising two electrodes, at least one of which includes active material structures formed using low-temperature electrochemical deposition, in accordance with some examples.

FIG. 4B is a schematic illustration of electrochemical cell 450, comprising first electrode 470, second electrode 480, and separator 490 arranged in a stack, wound jelly-roll, or any form. First electrode 470, second electrode 480, or both may include electroplated active material structures as described with reference to FIG. 4A above. Separator 490 is disposed between first electrode 470 and second electrode 480 to prevent direct contact between first electrode 470 and second electrode 480 yet allows ionic communication between these electrodes. Specifically, separator 490 may include pores allowing ions to pass. Electrochemical cell 450 also includes electrolyte 492, which operates as a carrier of ions during cycling of electrochemical cell 450. First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 may be connected to case 460 and/or lid 462. Some examples of electrochemical cell 450 include, but are not limited to, lithium-ion batteries, lithium polymer batteries, lithium-air batteries, lithium sulfite batteries, lithium metal batteries, solid-state batteries, supercapacitors, and the like.

Experimental Results of Non-Passivating Deposition

Various tests have been conducted to characterize non-passivating deposition methods described below. More specifically, non-passivating deposition methods were compared to other methods, which may be referred to as controlled methods.

Both types of methods used an electroplating apparatus, in which a voltage was applied between the cathode and anode to induce electrochemical reactions. It should be noted that the corresponding current represents the electrochemical reactions taking place on the electrodes or, more specifically, the rate of these reactions. In some examples, a constant current source is used to induce the electrochemical reaction (e.g., by increasing the voltage).

For this specific test, the cathode potential was set at −3.5V (vs. anode), which resulted in an initial current density of about 5~10 mA/cm$^2$ for a given system. Overall, the cathode potential can be −2 V to −6 V (vs. anode), which corresponds to the current density of about 2 mA/cm$^2$ to 4 mA/cm$^2$. It has been found that a minimum voltage of −2.5 V on the cathode vs the anode is needed in some examples. This minimum voltage depends on the cell chemistry.

The electroplating solution was maintained at room temperature (about 25° C.). It should be noted that electroplating at higher temperatures can be performed, e.g., using mineral oil baths (up to 50° C.) and/or sealed claves (up to 200° C.).

In both methods (non-passivating and controlled), periodical agitation was applied to both electrolyte solutions on the cathode side. For example, continuous stirring may be applied at a rotational speed of 100 RPM to 500 RPM. Overall, the agitation methods may include stirring, sonicating, flowing, or shaking of the electrolyte solution.

The deposition time is dependent on the amount of material to be produced. The amount of intermediate produced can be estimated from the total charge passed to the system by integrating the current vs. time (Q=I*t).

Both non-passivating and controlled electroplating solutions included SiCl$_4$ as a precursor (0.1~2M) and Bu$_4$NCl (0.1~2M) as a conductive agent. However, the non-passivating solution included DME as a solvent, while the controlled solution included PC as a solvent.

Figure 11A:
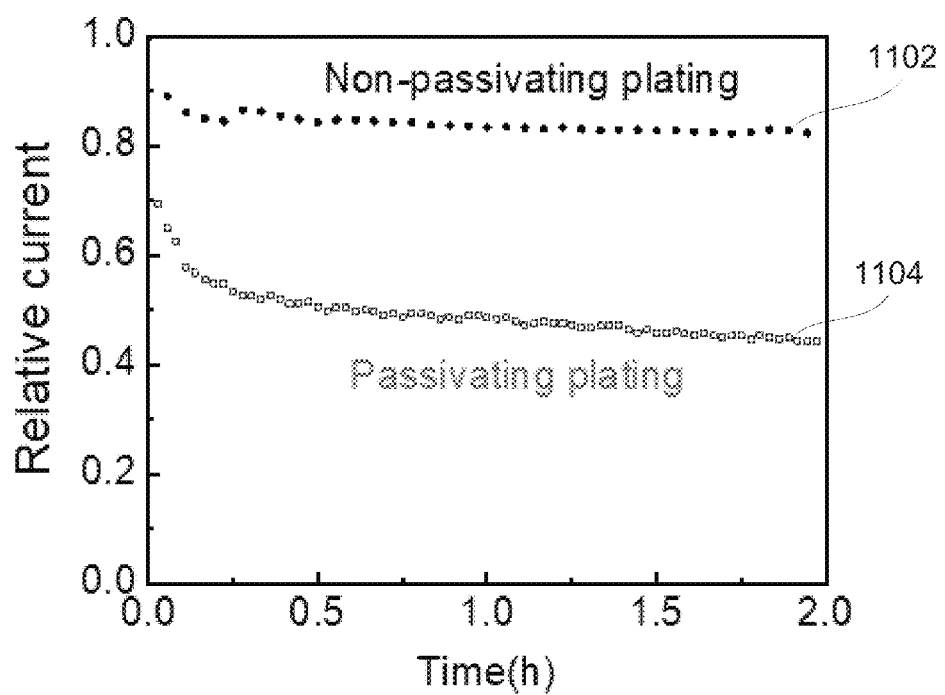
FIG. 11A illustrates the results of non-passivating vs. controlled deposition methods.

The results of this comparison test (non-passivating vs. controlled deposition methods) are presented in FIG. 11A. Line 1102 corresponds to a relative current profile of non-passivating plating, while line 1104 corresponds to a relative current profile of controlled plating. Both current profiles are normalized to the initial current value of each test. Line 1104 demonstrates a rapid drop in the current due to a corresponding deposition of silicon (which is a poor electronic conductor) on the cathode. The drop between 50% of the initial current happens in about 15 minutes, which corresponds to a thickness of about 1.5 micrometers. As noted above, the constant cathode voltage of −3.5V (vs. anode) was used for this test for both methods.

Referring to line 1102 in FIG. 11A, the current profile also experienced some initial drop of about 10%. This initial drop is the concentration gradient, established across the electrolyte. As such, cathode passivation/degradation was negligible. The deposited amount corresponding to line 1102 was twice greater than for the deposited amount corresponding to line 1104.

This comparison test has also shown that structures formed by the non-passivating electrodeposition method had a very loose attachment to the cathode surface and can be easily collected. The cathode with solid deposits was extracted from the electroplating solution and placed in a centrifuge tube. While the procedure was the same for the passivating and the non-passivating methods, the non-passivating electrodeposition method did not produce enough power to be collected. A cleaning solvent (i.e., dimethoxyethane) was used to wash down the solid from the electrode. Other examples of suitable solvents are propylene carbonate, acetonitrile, tetrahydrofuran, dimethoxyethane, alcohols, and toluene. In general, the mechanical impact of the solvent removes the deposited product. As such, various types of solvents may be used to achieve product removal. However, for the cleaning effect and purity, polar solvents facilitate salt removal. Furthermore, aprotic solvents help to avoid side reactions. Finally, volatile solvents are easy to remove by evaporation.

The centrifuge tube was gently shaken, resulting in the non-passivating deposits to remove from the cathodes (as was evident by a very opaque ("cloudy") cleaning solution). The opaqueness is caused by the deposits removed from the cathode surface and uniformly dispersed in the cleaning solution, forming a suspension.

Once removed from the cathode (by gentle shaking), the solid product was harvested from the cleaning solvent using a centrifuge. Specifically, the tube was centrifuged at 6000 rpm for 10 min to the solid product from the cleaning solvent. In some examples, this process is repeated 2-3 times to fully remove the remaining salts from the electrolyte. The final solid product is obtained. The cathode is slightly pulled out from the tube for inspection of the cathode surface, which is substantially free from deposits. The deposit are visible at the bottom of the container, separated from the cleaning solution. The passivation deposition causes the deposited material to adhere to the cathode more firmly (than the non-passivation deposition) due to the chemical bonds (e.g., Ni—Si, Fe—Si) between the deposited material and the cathode.

Figure 11B:
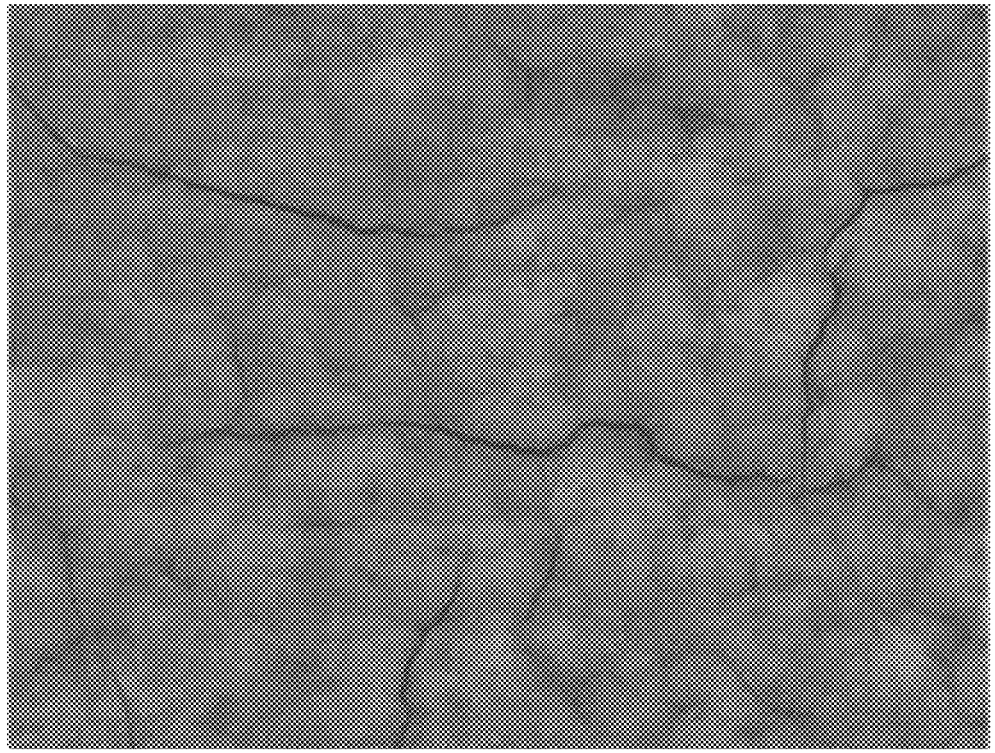
FIG. 11B is an SEM image of a sample formed using a passivating deposition method.
Figure 11C:
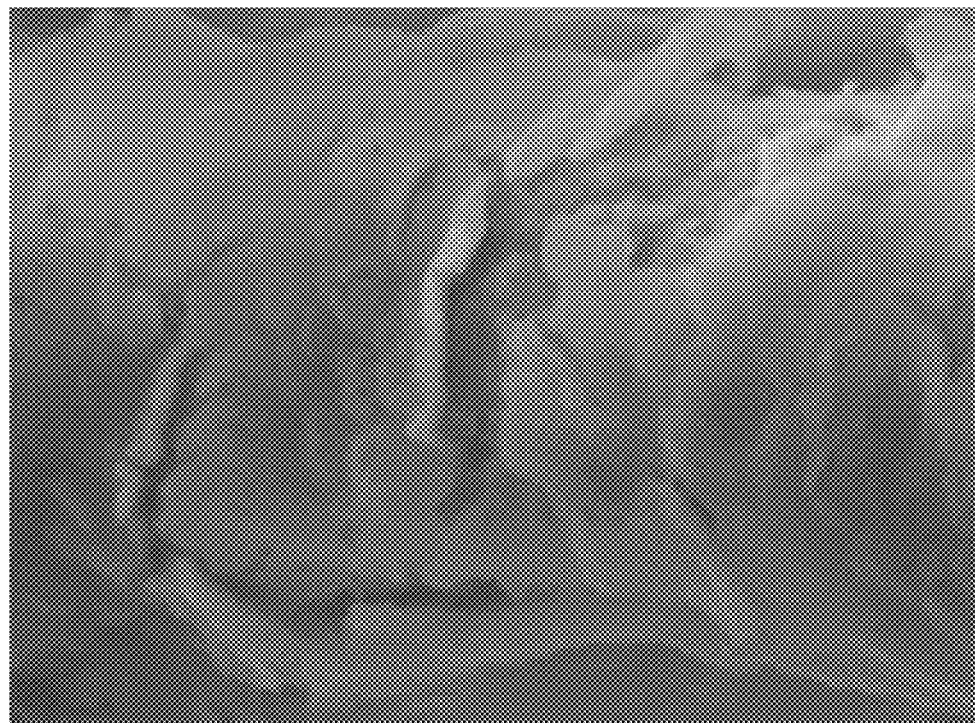
FIG. 11C is an SEM image of a sample formed using a non-passivating deposition method.

Morphology of the deposits (while still attached to the cathode surface) was characterized by scanning electron microscopy (SEM). Specifically, FIG. 11B is an SEM image of a sample formed using a passivating deposition method, while FIG. 11C is an SEM image of a sample formed using a non-passivating deposition method. The product, which is formed used the non-passivating deposition, is more porous and less firmly attached to the cathode than the product formed using the passivating deposition.

Figure 11D:
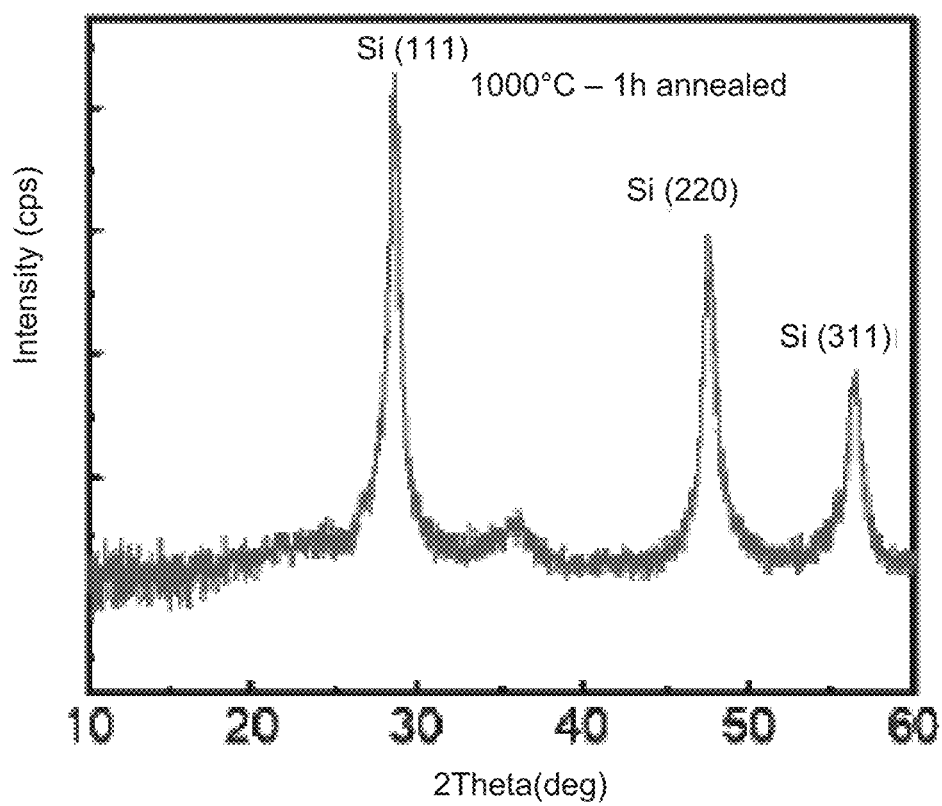
FIG. 11D is an XRD pattern of crystalline silicon obtained by annealing the deposited amorphous silicon at temperatures of 1000° C.

The deposited product was amorphous silicon, i.e., upon the deposition and before further processing. Crystalline silicon was obtained by annealing the as-deposited amorphous silicon at temperatures of 1000° C. (XRD patterns shown in FIG. 11D). Specifically, these XRD plots indicate that the deposited product was amorphous silicon, while the crystalline silicon is obtained after heating.

Figure 2I:
FIGS. 2I and 2J illustrate that the addition of a precipitating solvent induces homogenous precipitation of the product of the solid structure.
Figure 2J:
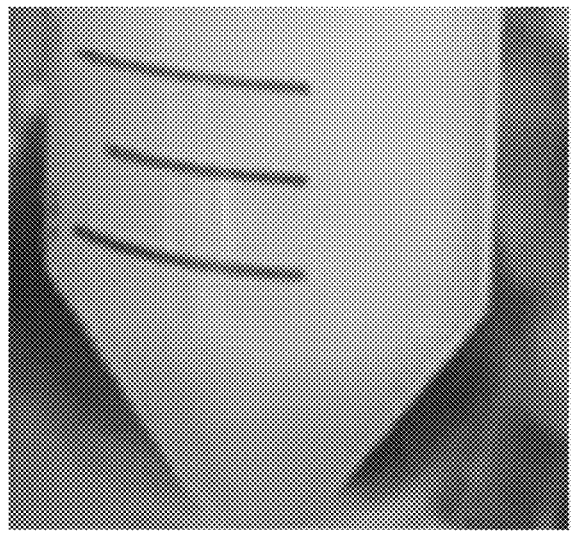
Figure 2K:
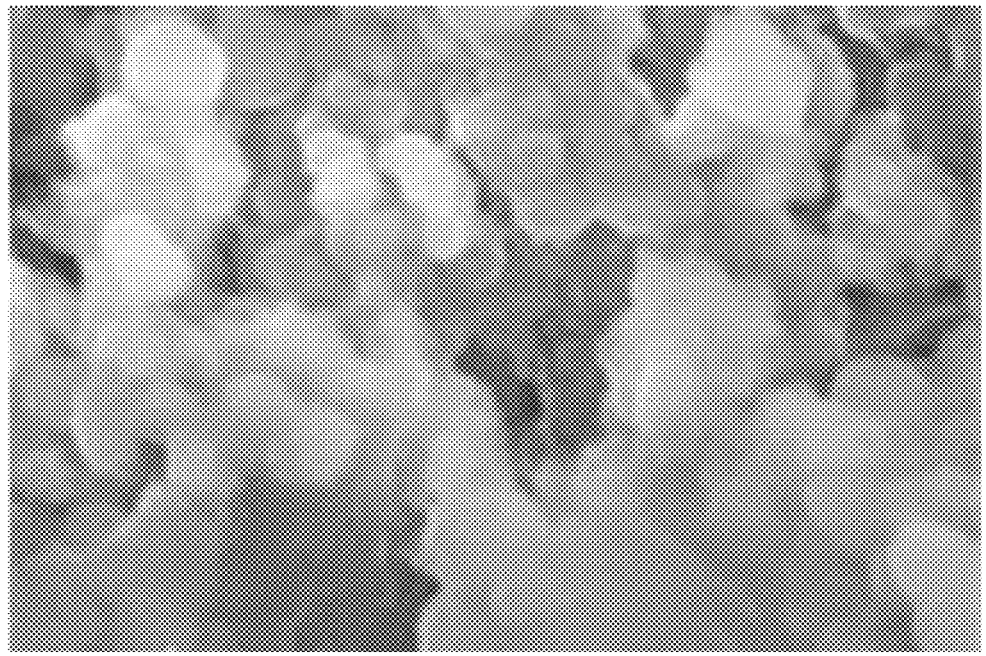
FIG. 2K illustrates an SEM image of silicon structures, formed in accordance with methods described herein, before annealing these silicon structures.
Figure 2L:
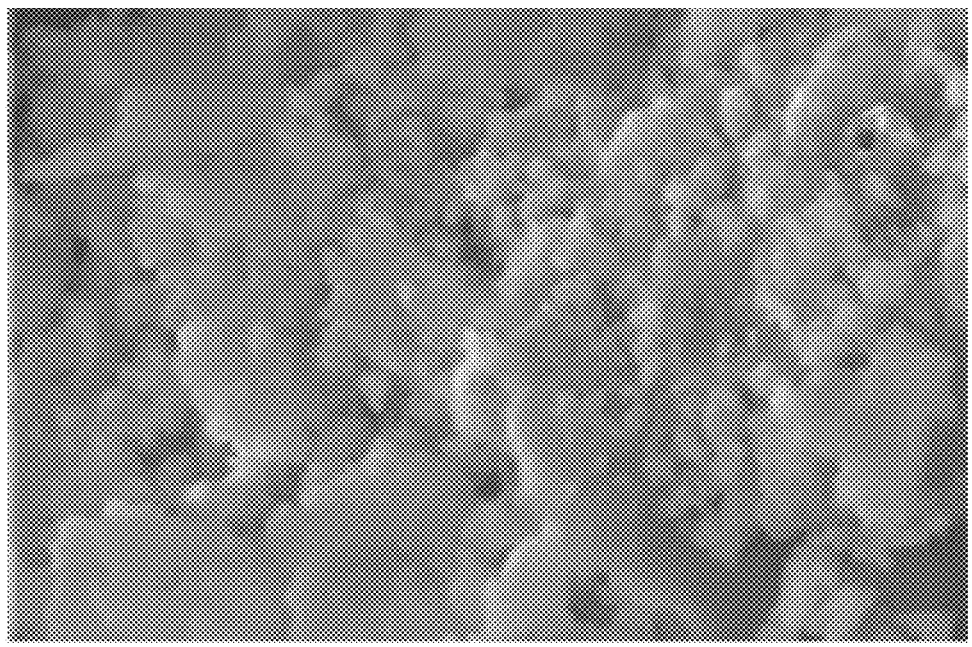
FIG. 2L illustrates an SEM image of silicon structures, formed in accordance with methods described herein, after annealing these silicon structures.
Figure 2M:
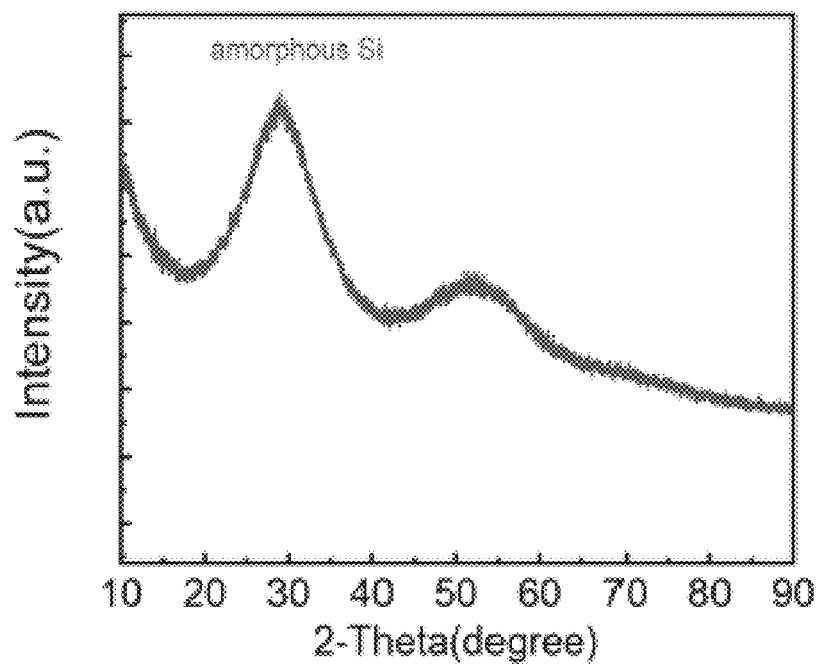
FIG. 2M is an XRD pattern for crystalline silicon formed by annealing the precipitated amorphous silicon structures at 600° C.
Figure 2N:
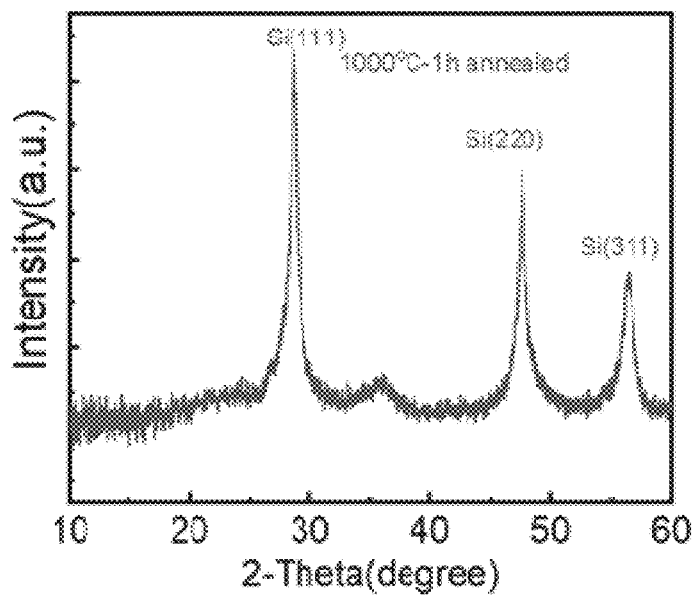
FIG. 2N is an XRD pattern for crystalline silicon formed by annealing the precipitated amorphous silicon structures at 1000° C.

An SEM analysis has shown that the deposited silicon agglomerates into tens of microns in diameter. For example, FIGS. 2K, 2Q, and 2R illustrate deposited samples before annealing, while FIG. 2K illustrates an annealed example.

The primary particles had a diameter in the range of 200 nanometers to 300 nanometers. The elemental analysis, performed using energy dispersive spectrum (EDS), indicates that silicon is the main element in the formed structures. Other elements in the formed structures include carbon (C), oxygen (O), and chlorine (Cl). The composition varies depending on the deposition method (passivating vs. non-passivating) and the post-deposition treatments, as shown in the following table.

| Deposition and Post/Deposition Processing | Atomic % | | | | |
|---|---|---|---|---|---|
| | Si | O | Cl | C | Other |
| Passivating Deposition/No Annealing | 59% | 16% | 3% | 6% | Trace |
| Non-Passivating Deposition/No Annealing | 22% | 24% | 5% | 49% | Trace |
| Non-Passivating Deposition/Annealed at 700° C. | 73% | 17% | 0% | 10% | Trace |

A relatively high concentration of other components, such as oxygen and carbon, in deposited structures and, later, in annealed structures may be beneficial for various applications, such as negative active materials for rechargeable electrochemical cells. For example, carbon can be used as a conductive additive in negative active material structures. Oxygen may help to mitigate swelling of structures (e.g., which may be as high as ten times for pure silicon charged to its theoretical capacity). Overall, processing materials (e.g., precursors, solvents, and conductivity agents), electroplating conditions (e.g., plating voltage, temperature, agitation), post-plating processing (e.g., annealing) may be specifically selected to achieve a design composition of the resulting structure (e.g., driven by specific applications).

Experimental Results of Multistage Deposition

A series of tests were conducted to determine various aspects of multistage deposition. One example of the deposition solutions, described above, used in this experiment. A voltage of −4V was applied between the cathode and anode to induce the electrochemical reactions. This voltage resulted in a current density of about 2-4 mA/cm$^2$. The electroplating solution was maintained at room temperature (~25° C.). Continuous agitation (e.g., using magnetic stirring) was applied to the electrolyte solution on the cathode side. This continuous agitation ensured a sufficient supply of the reactants to the cathode surface.

The electrolysis was characterized by the color change of the solution, without solid product formation. This level of electrolysis was achieved by a specific ratio of the supporting electrolyte to the metalloid halide precursor. Overall, an excess of supporting electrolytes is needed to provide enough complexing ligand (a) to make the intermediate soluble.

Furthermore, the reduction potential was specifically controlled to be higher than the metalloid deposition potential but lower than the metalloid halide reduction potential, referring to FIG. 2D and the corresponding description above. As noted above, the voltage was −1.8 V vs. Ag-reference. As a reference, the voltage of metalloid deposition is −2.5V vs. Ag-reference, while the voltage of metalloid halide reduction is −1.5V vs. Ag-reference.

Upon completion of the electrolysis step described above, the pre-processed plating solution in the cathode chamber was transferred into another container. The pre-processed plating solution may also be referred to as a liquid intermediate. While continuously agitating the pre-processed plating solution, a sufficient amount of a precipitating solvent (dimethyloxyethane) was added to the pre-processed plating solution. Other examples include tetraglyme, triglyme, diglyme, monoglyme, or tetrahydrofuran (THF). The volume ratio of the precipitating solvent to the pre-processed plating solution was 1:1. This addition of the precipitating solvent induces homogenous precipitation of the product of the solid structure, as shown in FIGS. 2I and 2J. Specifically, FIG. 2I illustrates a pre-processed plating solution, which is a clear liquid, before adding the precipitating solvent. FIG. 2J illustrates a mixture of the pre-processed plating solution and the precipitating solvent, which now has solid precipitates.

The morphology of the solid product may be controlled by the rate of adding the precipitating solvent, the amount of the precipitating solvent added to the pre-processed plating solution, the overall composition (e.g., the selection of the precipitating solvent), the temperature of the organic solvent, the intensity and method of the agitation applied to the liquid intermediate while adding the precipitating solvent, the process sequence (e.g., adding the organic solvent to liquid intermediate or vice versa).

After the solid structures are precipitated from the pre-processed plating solution, these solid structures were separated from the remaining portion of the solution using a centrifuge. Another suitable separation technique is filtration. These separated solid structures were further cleaned by a sequential wash, e.g., using a combination of organic solvents (e.g., dimethyloxyethane and tetrahydrofuran) to remove the residue salts. The remaining solution may be reused to prepare a fresh solution.

A scanning electron micrograph (SEM) was used to evaluate the formed solid structures. FIG. 2K illustrates an SEM image of silicon structures, formed in the above experiment, before annealing (i.e., as precipitated). This SEM image shows spherical particles, arranged into uniform agglomerates. The primary particles have a diameter in the range of 200 nanometers to 300 nanometers. FIG. 2L illustrates an SEM image of the same silicon structures after annealing.

The elemental analysis was performed using energy dispersive spectrum (EDS), which have indicated that silicon (Si) is the main material in these particles, with some carbon (C), oxygen (O), and chlorine (Cl) depending on the post-deposition treatments as shown in the following table:

| Deposition and Post/Deposition Processing | Atomic % | | | | |
|---|---|---|---|---|---|
| | Si | O | Cl | C | Other |
| Precipitation Deposition/No Annealing | 19% | 21% | 7% | 50% | Trace |
| Precipitation Deposition/Annealed at 600° C. | 40% | 40% | 1.4% | 17% | Trace |

The as precipitated material is amorphous. Crystalline silicon was obtained by annealing the as-precipitated amorphous silicon structures at 600° C. (corresponding to an XRD pattern in FIG. 2M) and 1000° C. (corresponding to an XRD pattern in FIG. 2N). The annealing also confirms that the silicon in the solid product is at reduced valent (SI(0) with surface oxide or Si(II)).

Experimental Results of Solvent-Free Electrolysis

A series of experiments were conducted to determine various aspects of solvent-free electrolysis. One example of electroplating solutions, described above, was used in this experiment. In these experiments, continuous agitation was applied to the electrolyte solution on the cathode side. The deposition voltage was −4 V. The minimum deposition voltage is selected to induce any observable solid deposition, which relies on the internal resistance of the electrolyzer. The deposition voltage window can be from −3.5 V to −6 V at the cathode vs the anode.

Figure 2O:
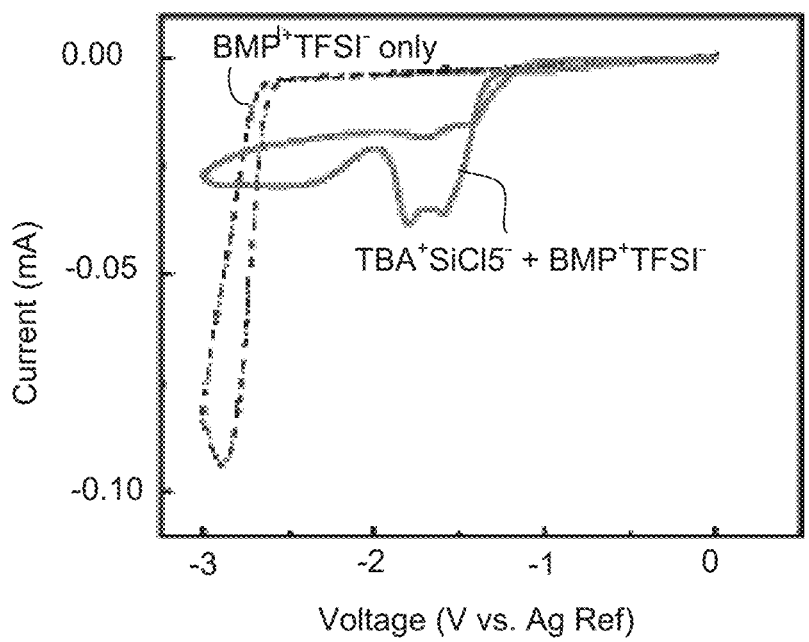
FIG. 2O illustrates a cyclic voltammetry scan of a Pt working electrode vs. an Ag reference with $S^+MX_{n+i}^-$ active ingredient (represented by the solid line) and without the $S^+MX_{n+i}^-$ active ingredient (represented by the dashed line).
Figure 2P:
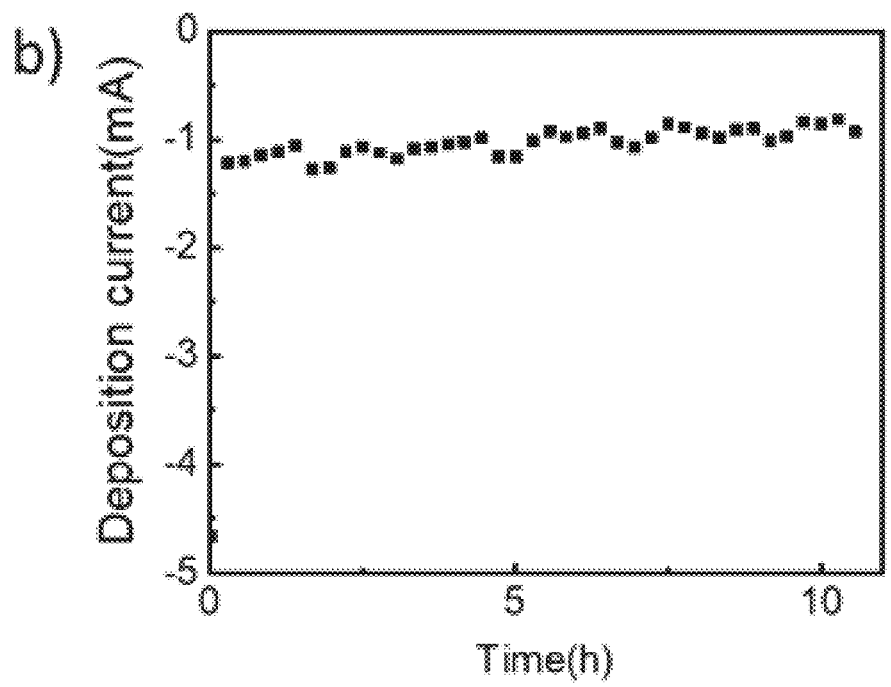
FIG. 2P illustrates a deposition current profile of continuous electrolysis of a two-electrode system for 10 hours with continuous agitation.
Figure 2Q:
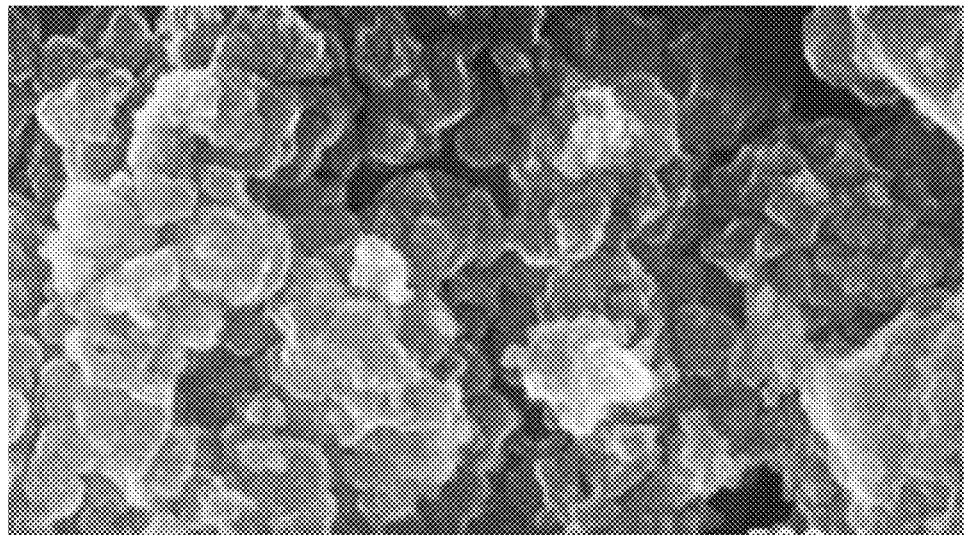
FIG. 2Q is an SEM image showing that the deposited microstructures being uniform particle agglomerates.
Figure 2R:
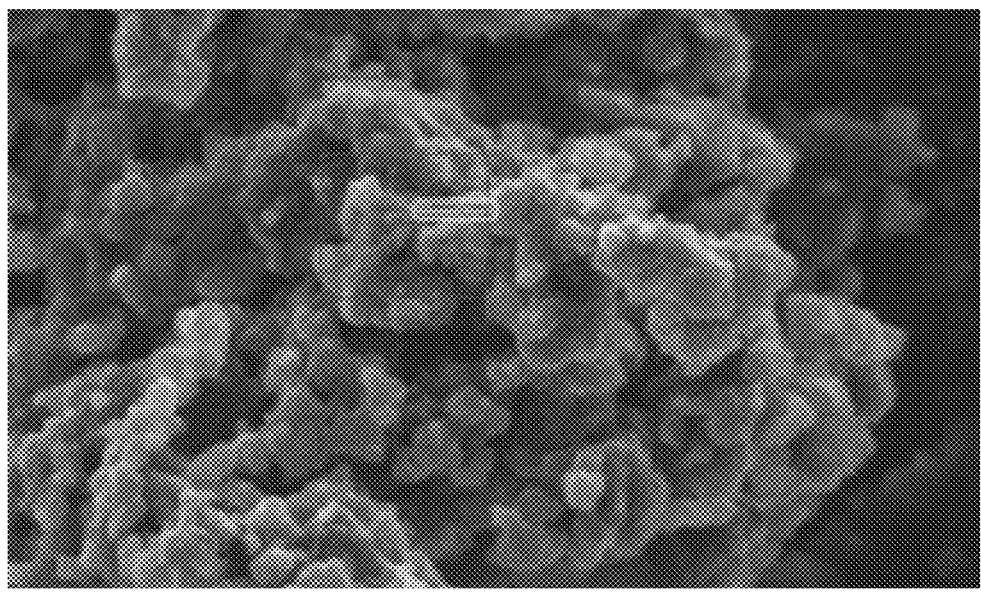
FIG. 2R is an SEM, focusing on an EDS sample.

FIG. 2O illustrates a cyclic voltammetry scan of Pt working electrode vs. Ag reference with $S^+MX_{n+i}^-$ active ingredient (represented by the solid line) and without the $S^+MX_{n+i}^-$ active ingredient (represented by the dashed line). The two-step reduction of $MX_{n+i}^-$ is evidenced by two reduction peaks at c.a. −1.6 V and −1.8 V, respectively. FIG. 2P illustrates a deposition current profile of continuous electrolysis of a two-electrode system for 10 hours with continuous agitation. The applied potential between the cathode (stainless steel mesh) and anode (graphite plate) was −5.5 V. The deposition time is dependent on the amount of material to be produced. The electrolysis is characterized by yellow solid deposits appearing in the plating solution. Yellow precipitated solid structures were collected after centrifuging and cleaning. Specifically, after solid structures were precipitated in the plating solution, the separation was performed using a centrifuge. Filtration is another option. The solid deposits were cleaned by a sequential wash of a combination of organic solvents to remove the residue salts.

Thereafter, heat treatment in inert atmospheres was performed to further improve product purity. The supernatant was feedback to the electrolyzer for continuous operation, after the replenishment of metalloid halide precursors that compensate for the amount of precursor consumed.

FIG. 2Q is a scanning electron micrograph (SEM), showing that the deposited microstructures were uniformly agglomerated of particles. The primary particles had a diameter in the range of 200 nanometers −300 nanometers. FIG. 2R is an SEM of a region where EDS was taken. Specifically, the elemental analysis by energy dispersive spectrum (EDS) indicates that Si is the main material, with or without carbon (C), oxygen (O), and trace chlorine (Cl) as presented in the following table:

| Deposition and Post/Deposition Processing | Atomic % | | | | |
|---|---|---|---|---|---|
| | Si | O | Cl | C | Other |
| Solvent-Free Deposition/No Annealing | 24% | 26% | 3% | 34% | Trace |
| Solvent-Free Deposition/Annealed at 600° C. | 31% | 45% | 0% | 21% | Trace |

Figure 2S:
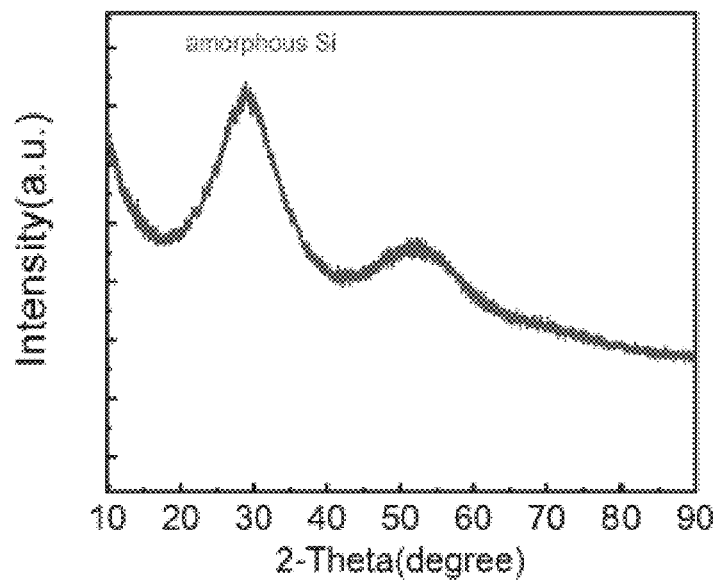
FIG. 2S illustrates an XRD pattern of deposited structures after annealing at 600° C.
Figure 2T:
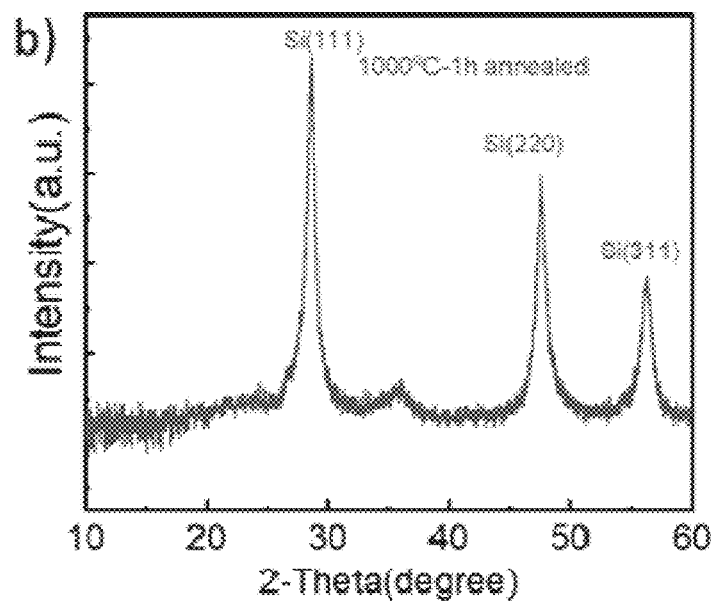
FIG. 2T illustrates an XRD pattern after deposited structures after annealing at 1000° C.

The as precipitated materials were amorphous silicon. Crystalline silicon was obtained by annealing the as-deposited amorphous silicon at 600° C. and 1000° C. FIG. 2S illustrates an X-ray diffraction (XRD) pattern of deposited structures after annealing at 600° C., while FIG. 2T illustrates an XRD pattern after deposited structures after annealing at 1000° C.

Additional Experimental Results

A series of tests were conducted to determine various parameters of low-temperature electrochemical deposition of silicon structures and characteristics of these deposited structures.

In one test, 0.8 grams of tetrabutylammonium chloride ($Bu_4NCl$) was dissolved in 36 grams of propylene carbonate (PC) solvent. Thereafter, 4 grams of trichlorosilane ($SiHCl_3$) were added to form a deposition media. Trichlorosilane is a precursor for silicon deposition, while tetrabutylammonium chloride is used to improve ionic conductivity.

Figure 5A:
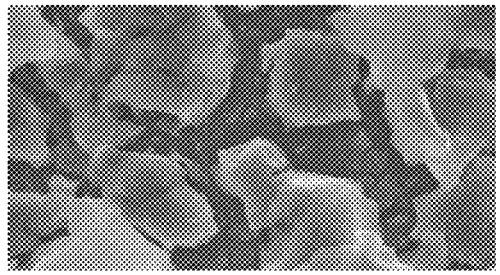
FIGS. 5A-5D are scanning electron micrographs (SEM) of various silicon structures formed using low-temperature electrochemical deposition.
Figure 5B:
Figure 5C:
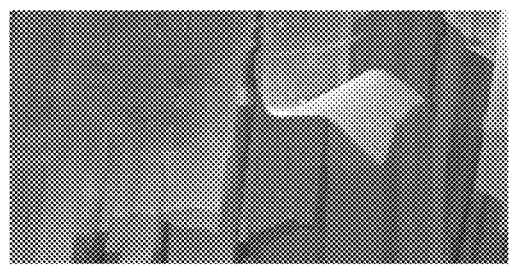
Figure 5D:

It has been found that the morphology of plated silicon can be controlled by varying electroplating parameters. In some examples, silicon particles are obtained if a metal (Ti, Ni) substrate or a Si wafer of <111> orientation is used as a working electrode. One example of silicon particles is shown in FIG. 5A. In some examples, silicon fibers, nanowires, flakes, and meshes can be obtained if a silicon wafer of <100> orientation is used as working in the potential range between −2.5 V and −3 V. The results of these experiments are shown in FIGS. 5B-5D.

In this experiment, a polished titanium plate was used as a working electrode, a polished Glassy-C electrode was used as a counter electrode, and a platinum wire was used as a reference electrode. The working electrode potential was set at −2.5 V versus the reference electrode while the current density is about 1 $mA/cm^2$. The current has decreased as silicon was deposited onto the working electrode, which has increased the impedance. Furthermore, silicon deposition is evidenced by the darkening of the submerged portion of the working electrode. The electrodes were rinsed with dimethyl carbonate (DMC) to remove the residual deposition media.

Crystalline silicon was then obtained by annealing the deposited amorphous Si at temperatures of between 600° C. and 1000° C. FIG. 6A illustrates the results of X-ray diffraction (XRD) analysis of the electrochemically deposited silicon before and after annealing. Furthermore, scanning electron micrograph (SEM) in FIG. 6B of the deposited sample before its annealing shows uniform agglomerates of distinct morphology. The elemental analysis performed using energy dispersive spectrum (EDS) indicates in FIG. 6C that silicon is the main material in the deposited sample. Traces of carbon (C), oxygen (O), and chlorine (Cl) may be presented depending on the post-deposition treatments. It is worth noting that as-deposited silicon is prone to oxidation, so the trace oxygen could be due to the brief exposure of the sample during handling and transferring.

Figure 7A:
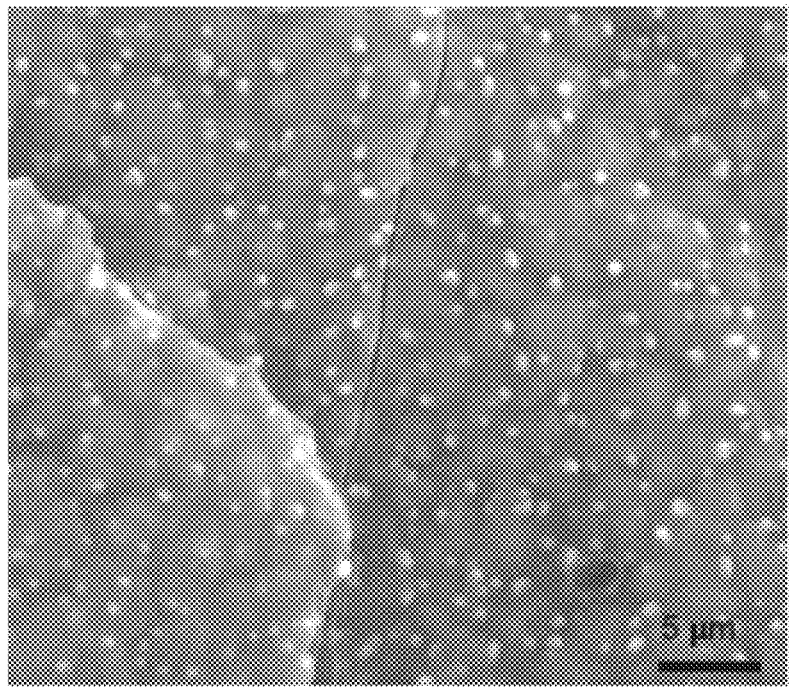
FIGS. 7A and 7B illustrate SEM images of silicon samples plated onto p-type silicon wafers.
Figure 7B:
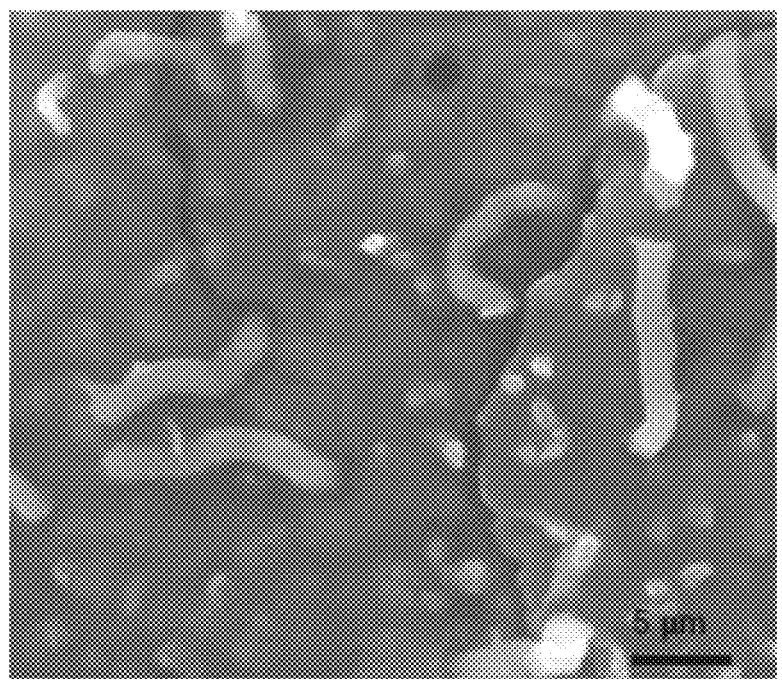

In some examples, the morphology and composition of the plated silicon can be controlled by selecting a substrate and/or applied potential. FIGS. 7A and 7B illustrate SEM images of silicon samples plated onto p-type silicon wafers. Instead of uniform deposits with similar contrast, these silicon samples show dots and wires embedded in the matrix. As such, the electronic conductivity of the substrate allows controlling electrochemical reduction of $SiHCl_3$ to silicon, resulting in different types of silicon structures can be obtained.

Figure 8A:
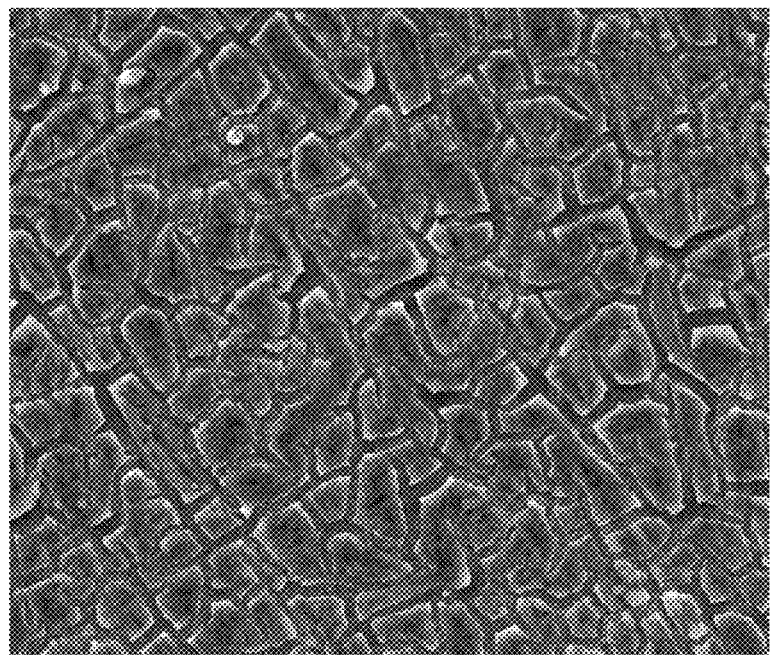
FIG. 8A is an SEM image showing silicon agglomerates on the titanium surface.
Figure 8B:
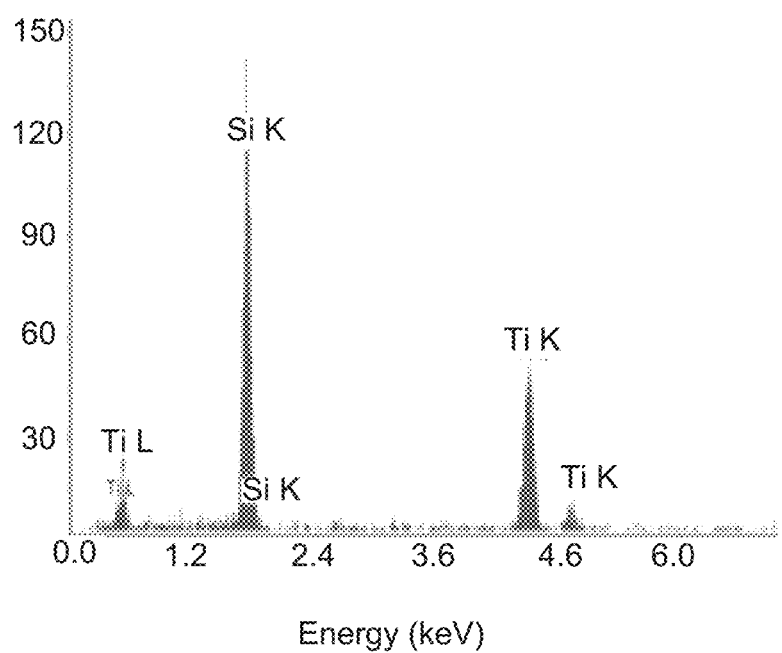
FIG. 8B illustrates the results of the EDS analysis of the sample shown in FIG. 8A.

FIG. 8A is an SEM image showing silicon agglomerates on the titanium surface, which is different from samples shown in FIGS. 7A and 7B. The results of the EDS analysis for this sample are presented in FIG. 8B, indicating no detectable impurities, such as chlorine (Cl).

Figure 9:
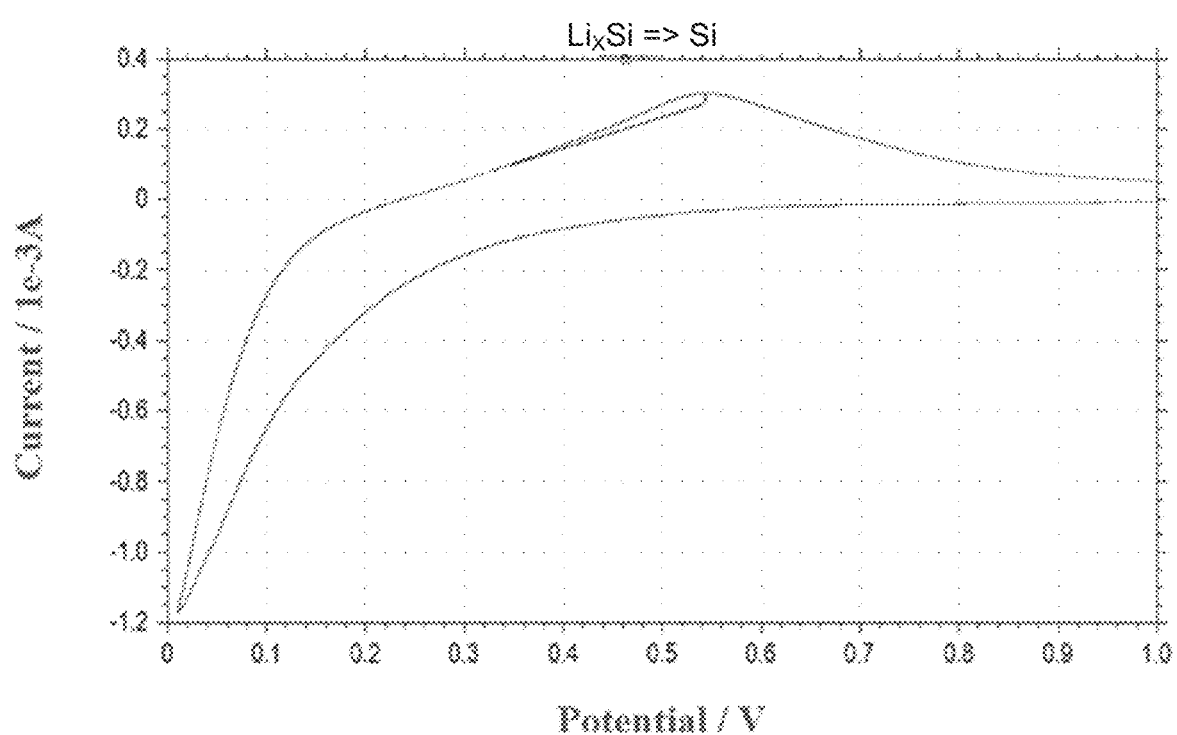
FIG. 9 illustrates a cyclic voltammogram (CV) of silicon, plated on the working electrode, and operable as a negative active material in the electrochemical test.

Furthermore, the working electrode was subjected to an electrochemical test, i.e., in an electrolyte solution containing lithium ions. FIG. 9 illustrates a cyclic voltammogram (CV) of silicon, plated on the working electrode, and operable as a negative active material in the electrochemical test. Specifically, the de-lithiation peak in the CV is located in the 0.4-0.7V range, which matches the expected decomposition reaction of $Li_xSi \rightarrow Si$.

Another experiment has been conducted to precipitate free-standing powder on a working electrode. Specifically, yellow silicon powder has been obtained in a three-electrode system using a platinum wire, as a working electrode. Large potentials over −5 V, versus a reference electrode that was another platinum wire, were used in this test. Due to the limited surface area of the working electrode and a high electric field (caused by the high voltage on a pointing curvature), silicon was reduced and separated from the substrate, precipitating out as suspension in the plating solution as shown in FIG. 10A. In another experiment shown in FIG. 10B, the potential was increased to −7 V. Overall, it has been found that the particle size and composition can be tuned by changing the plating parameters, such as solution components, current, voltage window, temperature, electrodes, and mechanical agitation (e.g., stirring or ultra-sonication).

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. A method of continuously forming active material structures for electrochemical cells, the method comprising:
 introducing an electroplating solution into an electroplating bath, wherein:
  the electroplating bath comprises a working electrode and a counter electrode,
  the electroplating solution comprises one or more precursors, one or more salts, and one or more solvents,
  the one or more salts are selected from the group consisting of tetrabutylammonium chloride ($Bu_4NCl$), tetrabutylammonium bromide ($Bu_4NBr$), tetrapropylammonium chloride ($Py_4NCl$), tetraethylammonium chloride ($Et_4NCl$), and lithium chloride (LiCl), 1-butyl-1-methylpyrrolidinium chloride ($PYR_{14}Cl$), and 1-propyl-1-methylpyrrolidinium chloride ($PYR_{13}Cl$), and
  the one or more precursors comprise one or more elements selected from the group consisting of silicon (Si) and germanium (Ge); and
 applying an electrical potential between the working electrode and the counter electrode and through the electroplating solution thereby forming a pre-processed plating solution from the electroplating solution; and
 after applying the electrical potential, adding a precipitating solvent to the pre-processed plating solution thereby causing precipitation of the active material structures,
  wherein the precipitating solvent comprises one or more of dimethyloxyethane, tetraglyme, triglyme, diglyme, monoglyme, and tetrahydrofuran (THF).

2. The method of claim 1, wherein:
 the working electrode comprises a metal plate, and
 the counter electrode comprises a carbon structure.

3. The method of claim 1, wherein the working electrode is a metal foam or mesh.

4. The method of claim 3, wherein the metal foam of the working electrode comprises nickel or stainless steel.

5. The method of claim 1, wherein the working electrode comprises an insulating mask disposed on a metal surface of the working electrode.

6. The method of claim 1, wherein the one or more precursors of the electroplating solution are selected from the group consisting of trichlorosilane ($SiHCl_3$), silicon tetrachloride ($SiCl_4$), silicon tetrabromide ($SiBr_4$), and silicon tetraiodide ($SiI_4$).

7. The method of claim 1, wherein:
 the one or more precursors of the electroplating solution comprise trichlorosilane comprising the silicon (Si), and
 the electroplating solution further comprises at least one of lithium chloride and titanium tetrachloride.

8. The method of claim 1, wherein the electroplating solution is maintained at a temperature of less than 200° C.

9. The method of claim 1,
 wherein the one or more precursors further comprise lithium (Li), and
 wherein the active material structures comprise a combination of the silicon (Si) and the lithium (Li) while the active material structures are being formed.

10. The method of claim 1, wherein the precipitation of the active material structures while adding the precipitating solvent to the pre-processed plating solution causes the active material structures to have a porosity of at least 20%.

11. The method of claim 1, wherein the precipitation of the active material structures while adding the precipitating solvent to the pre-processed plating solution causes the active material structures to form as loose particles suspended in a combination of the precipitating solvent and the pre-processed plating solution and have a size from 1 nanometer to 100 micrometers.

12. The method of claim 1, wherein the electroplating solution further comprises an additional non-reactive ionic liquid selected from the group consisting of 1-ethyl-3-methylimidazolium bis(trifluoromethylsulfonyl)imide (EMIMTFSI), 1-butyl-1-methylpyrrolidinium bis(trifluoromethanesulfonyl)imide (BMPTFSI), 1-propyl-1-methylpyrrolidinium bis(trifluoromethanesulfonyl)imide (PMPTFSI), or 1-butyl-3-methylimidazolium tetrafluoroborate ($bmimBF_4$).

13. The method of claim 1, further comprising:
 separating the active material structures from a combination of the precipitating solvent and the pre-processed plating solution, and
 annealing the active material structures.

14. The method of claim 1, wherein the active material structures, precipitated after adding the precipitating solvent to the pre-processed plating solution, are amorphous.

15. The method of claim 1, wherein:
 the one or more salts are operable as a conductivity agent in the electroplating solution, and
 a molar ratio of the conductivity agent to the one or more precursors is greater than 1.

16. The method of claim 15, wherein the molar ratio of the conductivity agent to the one or more precursors is greater than 2.

17. The method of claim 1, wherein the one or more elements in the pre-processed plating solution are in a partially reduced state.

18. The method of claim 1, wherein applying the electrical potential between the working electrode and the counter electrode comprises limiting a total charge passed between the working electrode and the counter electrode thereby limiting a reduction degree of the one or more elements in the pre-processed plating solution to not fully reduced states.

19. The method of claim 1, wherein:
 the one or more elements comprise silicon, and
 in the pre-processed plating solution, the one or more elements are a part of one or more of $Si_2Cl_4$, $SiCl_4^{2-}$, $SiCl^+$, and $SiCl_3^-$.

20. The method of claim 1, wherein the one or more solvents of the electroplating solution are selected from the group consisting of tetrahydrofuran, monoglyme, diglyme, triglyme, tetraglyme, acetonitrile, propyl carbonate, and an ionic liquid.

\* \* \* \* \*